US009160936B1

(12) United States Patent
Rivard et al.

(10) Patent No.: US 9,160,936 B1
(45) Date of Patent: Oct. 13, 2015

(54) SYSTEMS AND METHODS FOR GENERATING A HIGH-DYNAMIC RANGE (HDR) PIXEL STREAM

(71) Applicant: Duelight LLC, Sunnyvale, CA (US)

(72) Inventors: William Rivard, Menlo Park, CA (US); Adam Feder, Mountain View, CA (US); Brian Kindle, Sunnyvale, CA (US)

(73) Assignee: Duelight LLC, Sunnyvale, CA (US)

( * ) Notice: Subject to any disclaimer, the term of this patent is extended or adjusted under 35 U.S.C. 154(b) by 0 days.

(21) Appl. No.: 14/536,524

(22) Filed: Nov. 7, 2014

(51) Int. Cl.
*H04N 5/235* (2006.01)
*G06T 5/00* (2006.01)

(52) U.S. Cl.
CPC .............. *H04N 5/2355* (2013.01); *G06T 5/009* (2013.01); *G06T 2207/10004* (2013.01); *G06T 2207/20208* (2013.01)

(58) Field of Classification Search
CPC ... H04N 5/2355; H04N 5/2356; H04N 5/355; H04N 5/35536; H04N 5/35545; H04N 5/35554; H04N 5/35563; H04N 5/35572; H04N 5/35581; G06T 5/009; G06T 2207/10004; G06T 2207/20208
See application file for complete search history.

(56) References Cited

U.S. PATENT DOCUMENTS

| 5,818,977 | A | * | 10/1998 | Tansley | 382/294 |
|---|---|---|---|---|---|
| 6,243,430 | B1 | | 6/2001 | Mathe | |
| 6,498,926 | B1 | | 12/2002 | Ciccarelli et al. | |
| 7,256,381 | B2 | | 8/2007 | Asaba | |
| 7,760,246 | B2 | | 7/2010 | Dalton et al. | |
| 8,761,245 | B2 | | 6/2014 | Puri et al. | |
| 8,976,264 | B2 | | 3/2015 | Rivard et al. | |
| 2003/0015645 | A1 | | 1/2003 | Brickell et al. | |
| 2003/0142745 | A1 | | 7/2003 | Osawa | |
| 2006/0050165 | A1 | | 3/2006 | Amano | |
| 2006/0245014 | A1 | * | 11/2006 | Haneda | 358/512 |
| 2007/0025714 | A1 | | 2/2007 | Shiraki | |
| 2007/0030357 | A1 | | 2/2007 | Levien et al. | |
| 2007/0242900 | A1 | * | 10/2007 | Chen et al. | 382/294 |
| 2008/0030592 | A1 | | 2/2008 | Border et al. | |
| 2008/0158398 | A1 | * | 7/2008 | Yaffe et al. | 348/294 |
| 2008/0192064 | A1 | | 8/2008 | Hong et al. | |
| 2009/0066782 | A1 | | 3/2009 | Choi et al. | |
| 2009/0153245 | A1 | | 6/2009 | Lee | |
| 2009/0295941 | A1 | * | 12/2009 | Nakajima et al. | 348/229.1 |
| 2010/0118204 | A1 | | 5/2010 | Proca et al. | |
| 2010/0194851 | A1 | | 8/2010 | Pasupaleti et al. | |
| 2010/0208099 | A1 | | 8/2010 | Nomura | |
| 2010/0302407 | A1 | | 12/2010 | Ayers et al. | |
| 2011/0019051 | A1 | | 1/2011 | Yin et al. | |
| 2011/0090385 | A1 | | 4/2011 | Aoyama et al. | |

(Continued)

OTHER PUBLICATIONS

Non-Final Office Action from U.S. Appl. No. 13/573,252, dated Jul. 10, 2014.

(Continued)

*Primary Examiner* — Dennis Hogue
(74) *Attorney, Agent, or Firm* — Zilka-Kotab, PC

(57) ABSTRACT

A system, method, and computer program product are provided for performing high dynamic range mixing on a pixel stream. In use, the system receives a pixel stream including at least two exposures per pixel from a plurality of pixels of an image sensor. The system then generates a high dynamic range (HDR) pixel stream by performing HDR mixing on the received pixel stream. Finally, the system outputs the HDR pixel stream. Additional systems, methods, and computer program products are also presented.

16 Claims, 19 Drawing Sheets

(56) References Cited

U.S. PATENT DOCUMENTS

| | | | |
|---|---|---|---|
| 2011/0115971 | A1 | 5/2011 | Furuya et al. |
| 2011/0134267 | A1 | 6/2011 | Ohya |
| 2011/0194618 | A1* | 8/2011 | Gish et al. ............... 375/240.25 |
| 2011/0242334 | A1 | 10/2011 | Wilburn et al. |
| 2011/0280541 | A1 | 11/2011 | Lee |
| 2012/0002089 | A1 | 1/2012 | Wang et al. |
| 2012/0033118 | A1 | 2/2012 | Lee et al. |
| 2012/0069213 | A1 | 3/2012 | Jannard et al. |
| 2012/0162465 | A1 | 6/2012 | Culbert et al. |
| 2012/0262600 | A1 | 10/2012 | Velarde et al. |
| 2012/0314100 | A1 | 12/2012 | Frank |
| 2013/0107062 | A1 | 5/2013 | Okazaki |
| 2013/0114894 | A1 | 5/2013 | Yadav et al. |
| 2013/0147979 | A1 | 6/2013 | McMahon et al. |
| 2013/0176458 | A1 | 7/2013 | Van Dalen et al. |
| 2013/0223530 | A1 | 8/2013 | Demos |
| 2013/0271631 | A1 | 10/2013 | Tatsuzawa et al. |
| 2013/0279584 | A1 | 10/2013 | Demos |
| 2013/0301729 | A1 | 11/2013 | Demos |
| 2013/0335596 | A1 | 12/2013 | Demandolx et al. |
| 2014/0098248 | A1 | 4/2014 | Okazaki |
| 2014/0176757 | A1 | 6/2014 | Rivard et al. |
| 2014/0211852 | A1 | 7/2014 | Demos |
| 2014/0244858 | A1 | 8/2014 | Okazaki |
| 2014/0247979 | A1 | 9/2014 | Roffet et al. |
| 2014/0300795 | A1 | 10/2014 | Bilcu et al. |
| 2015/0005637 | A1 | 1/2015 | Stegman et al. |
| 2015/0092852 | A1 | 4/2015 | Demos |
| 2015/0098651 | A1 | 4/2015 | Rivard et al. |

OTHER PUBLICATIONS

Feder et al., U.S. Appl. No. 13/999,678, filed Mar. 14, 214.
Rivard, W. et al., U.S. Appl. No. 14/568,045, filed Dec. 11, 2014.
Restriction Requirement from U.S. Appl. No. 14/568,045, dated Jan. 15, 2015.
Rivard, W. et al., U.S. Appl. No. 14/534,068, filed Nov. 5, 2014.
Non-Final Office Action from U.S. Appl. No. 14/534,068, dated Feb. 17, 2015.
Rivard, W. et al., U.S. Appl. No. 14/534,079, filed Nov. 5, 2014.
Non-Final Office Action from U.S. Appl. No. 14/534,079, dated Jan. 29, 2015.
Rivard, W. et al., U.S. Appl. No. 14/534,089, filed Nov. 5, 2014.
Non-Final Office Action from U.S. Appl. No. 14/534,089, dated Feb. 25, 2015.
Rivard, W. et al., U.S. Appl. No. 14/535,274, filed Nov. 6, 2014.
Non-Final Office Action from U.S. Appl. No. 14/535,274, dated Feb. 3, 2015.
Rivard, W. et al., U.S. Appl. No. 14/535,279, filed Nov. 6, 2014.
Non-Final Office Action from U.S. Appl. No. 14/535,279, dated Feb. 5, 2015.
Rivard, W. et al., U.S. Appl. No. 14/535,282, filed Nov. 6, 2014.
Non-Final Office Action from U.S. Appl. No. 14/535,282, dated Jan. 30, 2015.
Notice of Allowance from U.S. Appl. No. 13/573,252, dated Oct. 22, 2014.
Non-Final Office Action from U.S. Appl. No. 14/568,045, dated Mar. 24, 2015.
Rivard, W. et al., U.S. Appl. No. 14/702,549, filed May 1, 2015.
Notice of Allowance from U.S. Appl. No. 14/534,079, dated May 11, 2015.
Notice of Allowance from U.S. Appl. No. 14/535,274, dated May 26, 2015.
Notice of Allowance from U.S. Appl. No. 14/534,089, dated Jun. 23, 2015.
Notice of Allowance from U.S. Appl. No. 14/535,282, dated Jun. 23, 2015.
Notice of Allowance from U.S. Appl. No. 14/534,068, dated Jul. 29, 2015.
Notice of Allowance from U.S. Appl. No. 14/535,279, dated Aug. 31, 2015.

* cited by examiner

SYSTEMS AND METHODS FOR GENERATING A HIGH-DYNAMIC RANGE (HDR) PIXEL STREAM

RELATED APPLICATIONS

This application is related to the following U.S. Patent Applications, the entire disclosures being incorporated by reference herein: application Ser. No. 13/573,252, filed Sep. 4, 2012, entitled "IMPROVED COLOR BALANCE IN DIGITAL PHOTOGRAPHY"; application Ser. No. 14/534,068, filed Nov. 5, 2014, entitled "SYSTEMS AND METHODS FOR HIGH-DYNAMIC RANGE IMAGES"; application Ser. No. 14/534,079, filed Nov. 5, 2014, entitled "IMAGE SENSOR APPARATUS AND METHOD FOR OBTAINING MULTIPLE EXPOSURES WITH ZERO INTERFRAME TIME"; application Ser. No. 14/534,089, filed Nov. 5, 2014, entitled "IMAGE SENSOR APPARATUS AND METHOD FOR SIMULTANEOUSLY CAPTURING MULTIPLE IMAGES"; application Ser. No. 14/535,274, filed Nov. 6, 2014, entitled "IMAGE SENSOR APPARATUS AND METHOD FOR SIMULTANEOUSLY CAPTURING FLASH AND AMBIENT ILLUMINATED IMAGES"; and application Ser. No. 14/535.279, filed Nov. 6, 2014, entitled "IMAGE SENSOR APPARATUS AND METHOD FOR OBTAINING LOW-NOISE, HIGH-SPEED CAPTURES OF A PHOTOGRAPHIC SCENE."

FIELD OF THE INVENTION

The present invention relates to digital photographic systems, and more particularly to systems and methods for generating high-dynamic range images.

BACKGROUND

Traditional digital photography systems are inherently limited by the dynamic range of a capturing image sensor. One solution to such limitation is the use of high dynamic-range (HDR) photography. HDR photography involves capturing multiple exposures of a same scene, where each of the exposures is metered differently, and then merging the multiple captures to create an image with a larger dynamic range.

SUMMARY

A system, method, and computer program product are provided for performing high dynamic range mixing on a pixel stream. In use, the system receives a pixel stream including at least two exposures per pixel from a plurality of pixels of an image sensor. The system then generates a high dynamic range (HDR) pixel stream by performing HDR mixing on the received pixel stream. Finally, the system outputs the HDR pixel stream. Additional systems, methods, and computer program products are also presented.

DETAILED DESCRIPTION

Glossary

Brighter pixel=a pixel that is brighter than a corresponding darker pixel.

Darker pixel=a pixel that is darker than a corresponding brighter pixel.

Attribute=a characteristic of a pixel including an intensity, a saturation, a hue, a color space value, a brightness, an RGB color, a luminance, or a chrominance.

Scalar=a result identified based on a first pixel attribute and a second pixel attribute.

Blending=a process that is based on two or more pixels including taking an average of two or more pixel points, summing and normalizing a color attribute associated with each pixel point, determining a RGB vector length which may then be normalized, or combining at least a brighter pixel and a darker pixel based on a function of attributes for each.

Digital photographic system=a mobile device, camera, tablet, or desktop computer.

Wireless mobile device=a smart phone configured to include a digital camera, a digital camera configured to include wireless network connectivity, a reality augmentation device, or a laptop configured to include a digital camera and wireless network connectivity.

Strength function or coefficient=element to control the extent of a function operating on two or more pixels.

Event timing error=a difference in time from an intended event occurrence to the time of a corresponding actual event occurrence.

Effect function=a function to alter an intensity, a saturation, a hue, a color space value, a brightness, an RGB color, a luminance, a chrominance, a contrast, a levels function, a curves function, or a function which includes a filter, including a pastel look, a watercolor function, a charcoal look, a graphic pen look, an outline of detected edges, a change of grain or of noise, or a change of texture.

Exposure parameter=an ISO, an exposure time, or an aperture.

Image stack=two or more images.

Levels mapping=adjustment of intensity levels based on a transfer function.

Analog pixel data=a set of spatially discrete intensity samples, each represented by continuous analog values.

Figure 1:
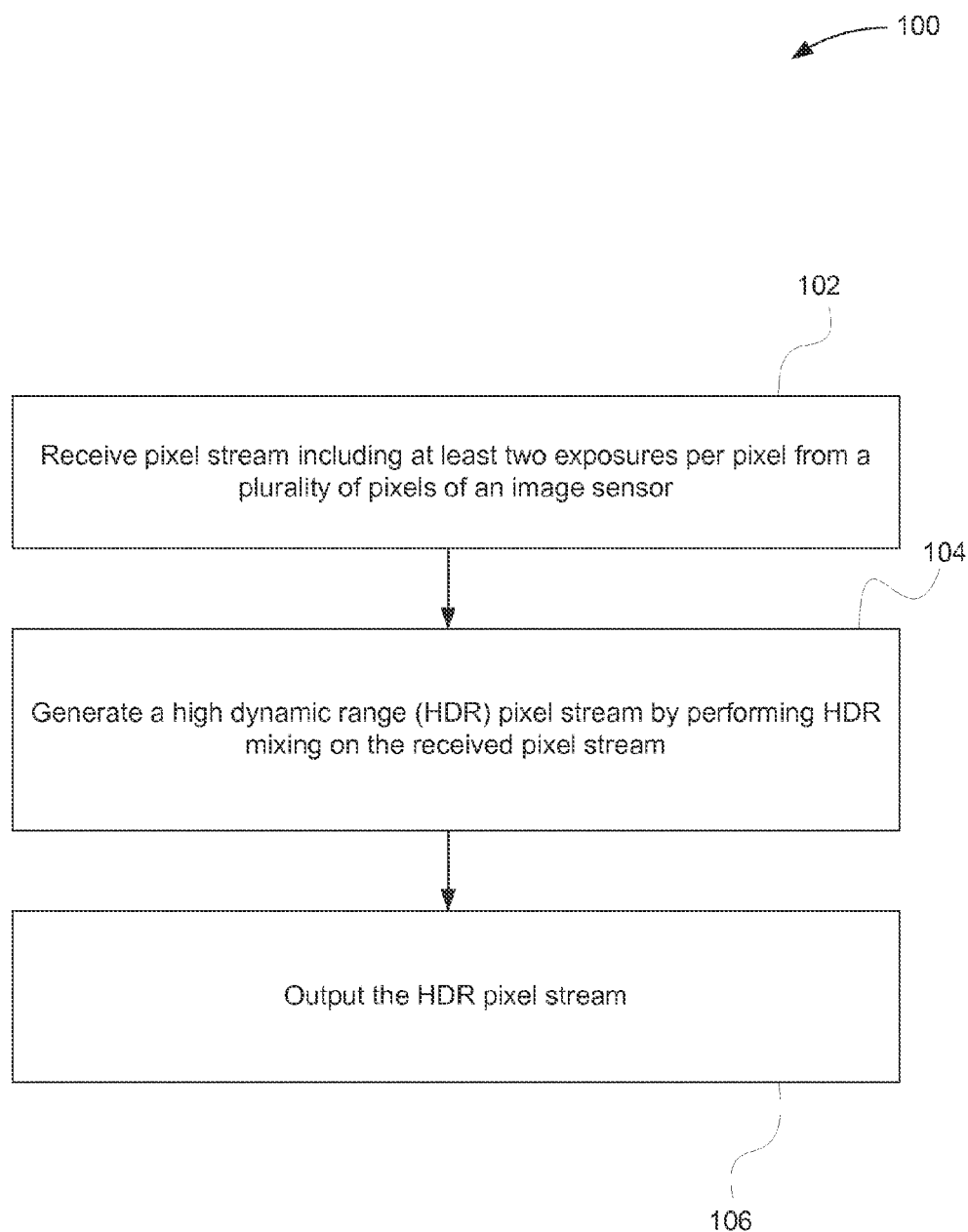
FIG. 1 illustrates an exemplary method for generating a high dynamic range (HDR) pixel stream, in accordance with an embodiment.

FIG. 1 illustrates an exemplary method 100 for generating a high dynamic range (HDR) pixel stream, in accordance with one possible embodiment. As an option, the method 100 may be carried out in the context of any of the Figures. Of course, however, the method 100 may be carried out in any desired environment. Further, the aforementioned definitions may equally apply to the description below.

As shown, at operation 102, a pixel stream is received, and the pixel stream includes at least two exposures per pixel of a plurality of pixels of the image sensor. In one embodiment, the pixel stream may be received directly from the image sensor. In another embodiment, the pixel stream may be received from a controller, where the controller first receives the pixel stream from an image sensor. In yet another embodiment, the pixel stream may be received from a camera module, or any other hardware component, which may first receive the pixel stream generated by an image sensor.

The pixel stream includes at least two exposures per pixel of a plurality of pixels of an image sensor. In one embodiment, the pixel stream includes a sequence of digital pixel data associated with the pixels of the image sensor. The sequence of digital pixel data may include, for each of the pixels, values representative of pixel attributes, such as brightness, intensity, color, etc. Each exposure of a given pixel may be associated with a different value for a given attribute, such as brightness, such that each of the exposures may include a unique attribute value. For example, in one embodiment, pixel data for a first exposure of a given pixel may include a first attribute value, pixel data for a third exposure of the pixel may include a third attribute value different than the first value, and pixel data for a second exposure of the pixel may include a second value between the first value and the third value. In one embodiment, each value may include a brightness value.

Further, the pixel stream may include at least two units of digital pixel data for each pixel, where each unit of digital pixel data is associated with a different exposure. Still further, a first unit of the digital pixel data for a pixel may be associated with a first set of digital pixel data, and a second unit of the digital pixel data for the pixel may be associated with a second set of digital pixel data. In such an embodiment, each set of digital pixel data may be associated with at least a portion of a digital image. For example, a first set of digital pixel data may be associated with a first digital image, and a second set of digital pixel data may be associated with a second digital image.

In on embodiment, each set of digital pixel data may be representative of an optical image of a photographic scene focused on an image sensor. For example, a first set of digital pixel data in the pixel stream may be representative of a first exposure of an optical image focused on an image sensor, and a second set of digital pixel data in the pixel stream may be representative of a second exposure of the optical image focused on the image sensor.

To this end, a pixel stream may include two sets of digital pixel data, where each set includes a corresponding unit of digital pixel data for a given pixel of an image sensor at a different exposure, such that the pixel stream includes digital pixel data for two different exposures of a same photographic scene image.

In one embodiment, the pixel stream may include a first set of digital pixel data interleaved with a second set of digital pixel data. For example, the pixel stream may include first digital pixel data for a first line of pixels, then second digital pixel data for the first line of pixels, then first digital pixel data for a second line of pixels, and then second digital pixel data for the second line of pixels, and so on. Of course, the pixel stream may include two or more sets of digital pixel data interleaved in any fashion. Still yet, the pixel stream may comprise two or more sets of digital pixel data organized in a non-interleaved fashion.

In one embodiment, the at least two exposures may be of the same photographic scene. For example, the at least two exposures may include a brighter exposure and a darker exposure of the same photographic scene. As another example, the at least two exposures may include each of the brighter exposure, the darker exposure, and a median exposure of the same photographic scene. The median exposure may be brighter than the darker exposure, but darker than the brighter exposure. In one embodiment, a brightness of an exposure may be controlled utilizing one or more exposure times. In another embodiment, a brightness of an exposure may be controlled utilizing one or more gains or one or more ISO values. Of course, a brightness of each exposure may be controlled utilizing any technically feasible technique.

In one embodiment, the image sensor may include a plurality of pixels arranged in a two-dimensional grid or array. Further, each of the pixels may include one or more cells, where each cell includes one or more photodiodes. Under the control of one or more control signals, each cell of the image sensor may measure or sample an amount of incident light focused on the photodiode of the cell, and store an analog value representative of the incident light sampled. In one embodiment, the analog values stored in the one or more cells of a pixel may be output in an analog signal, and the analog signal may then be amplified and/or converted to two or more digital signals, where each digital signal may be associated with a different effective exposure, as disclosed in U.S. patent application Ser. No. filed 14/534,079, entitled "IMAGE SENSOR APPARATUS AND METHOD FOR OBTAINING MULTIPLE EXPOSURES WITH ZERO INTERFRAME TIME." which is incorporated by reference as though set forth in full. An analog signal may be a set of spatially discrete intensity samples, each represented by continuous analog values. Analog pixel data may be analog signal values associated with one or more given pixels.

In another embodiment, each cell of a pixel may store two or more analog values, where each of the analog values is obtained by sampling an exposure of incident light for a different sample time. The analog values stored in the one or more cells of a pixel may be output in two or more analog signals, and the analog signals may then be amplified and/or converted to two or more digital signals, where each digital signal may be associated with a different effective exposure, as disclosed in application Ser. No. 14/534,089, filed Nov. 5, 2014, entitled "IMAGE SENSOR APPARATUS AND METHOD FOR SIMULTANEOUSLY CAPTURING MUL- TIPLE IMAGES"; or application Ser. No. 14/535,274, filed Nov. 6, 2014, entitled "IMAGE SENSOR APPARATUS AND METHOD FOR SIMULTANEOUSLY CAPTURING FLASH AND AMBIENT ILLUMINATED IMAGES;" or application Ser. No. 14/535,279, filed Nov. 6, 2014, entitled "IMAGE SENSOR APPARATUS AND METHOD FOR OBTAINING LOW-NOISE, HIGH-SPEED CAPTURES OF A PHOTOGRAPHIC SCENE;" which are all incorporated by reference as though set forth in full.

To this end, the one or more digital signals may comprise a pixel stream including at least two exposures per pixel from a plurality of pixels of an image sensor.

Further, at operation 104, a high dynamic range (HDR) pixel stream is generated by performing HDR blending on the received pixel stream. In one embodiment, the HDR blending of the received pixel stream may generate a HDR pixel for each pixel of the plurality of pixels of the image sensor, and the HDR pixel may be based on the at least two exposures from the pixel. For example, a HDR blending operation may receive as input the at least two exposures of a pixel of the image sensor, and then blend the at least two exposures of the pixel to generate a HDR pixel. In a specific embodiment, the blending of the at least two exposures of the pixel may include a mix operation. In one embodiment, a generated HDR pixel for a given pixel may be output in a HDR pixel stream, and the HDR pixel stream also includes HDR pixels generated based on exposures received from neighboring pixels of the given pixel. Each HDR pixel may be based on at least two exposures received from an image sensor.

Finally, at operation 106, the HDR pixel stream is outputted. In one embodiment, the HDR pixel stream may be outputted as a sequence of individual HDR pixels. In another embodiment, the HDR pixel stream may be output to an application processor, which may then control storage and/or display of the HDR pixel stream. In yet another embodiment, the HDR pixel stream may be stored in associated with the pixel stream utilized to generate the HDR pixel stream. Storing the pixel stream in association with the HDR pixel stream may facilitate later retrieval of the pixel stream.

Figure 2:
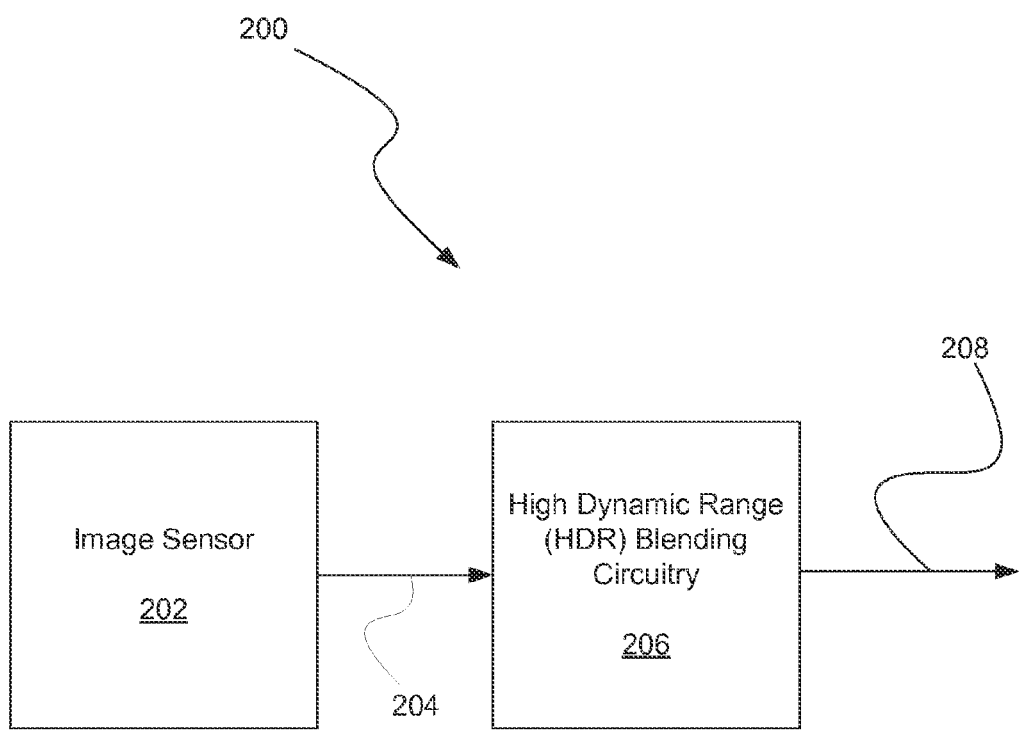
FIG. 2 illustrates a system for generating a HDR pixel stream, in accordance with another embodiment.

FIG. 2 illustrates a system 200 for generating a HDR pixel stream, in accordance with one embodiment. As an option, the system 200 may be implemented in the context of any of the Figures. Of course, however, the system 200 may be implemented in any desired environment. Further, the aforementioned definitions may equally apply to the description below.

As shown in FIG. 2, the system 200 includes a high dynamic range (HDR) blending circuitry 206 receiving a pixel stream 204 from an image sensor 202. Still further, the HDR blending circuitry 206 is shown to output a HDR pixel stream 208.

In one embodiment, the image sensor 202 may comprise a complementary metal oxide semiconductor (CMOS) image sensor, or charge-coupled device (CCD) image sensor, or any other technically feasible form of image sensor. In another embodiment, the image sensor 202 may include a plurality of pixels arranged in a two-dimensional array or plane on a surface of the image sensor 202.

In another embodiment, an optical image focused on the image sensor 202 may result in a plurality of analog values being stored and output as an analog signal that includes at least one analog value for each pixel of the image sensor. The analog signal may be amplified to generate two or more amplified analog signals utilizing two or more gains. In such an embodiment, a digital signal may then be generated based on each amplified analog signal, such that two or more digital signals are generated. In various embodiments, the two or more digital signals may comprise the pixel stream 204.

In yet another embodiment, a first set of analog values may be output as a first analog signal that includes at least one analog value for each pixel of the image sensor, and a second set of analog values may be output as a second analog signal that includes at least one analog value for each pixel of the image sensor. In such an embodiment, each analog signal may subsequently be processed and converted to one or more digital signals, such that two or more digital signals are generated. In various embodiments, the two or more digital signals may comprise the pixel stream 204.

Accordingly, in one embodiment, the pixel stream 204 generated by the image sensor 202 may include at least two electronic representations of an optical image that has been focused on the image sensor 202. Further, each electronic representation of the optical image may include digital pixel data generated utilizing one or more analog signals.

In one embodiment, the HDR blending circuitry 206 may include any hardware component or circuitry operable to receive a pixel stream and generate a HDR pixel stream based on the content of the received pixel stream. As noted above, the pixel stream may include multiple instances of digital pixel data. For example, the pixel stream may include first digital pixel data from a first exposure of a photographic scene and second digital pixel data from a second exposure of the photographic scene. The first exposure and the second exposure may vary based on exposure or sample timing, gain application or amplification, or any other exposure parameter that may result in a first exposure of a photographic scene and a second exposure of the photographic scene that is different than the first exposure.

Additionally, the HDR blending circuitry 206 may perform any blending operation on the pixel stream 204 that is operative to generate HDR pixel stream 208. In one embodiment, a blending operation of the HDR blending circuitry 206 may include blending two exposures received from a pixel of the image sensor 202. In another embodiment, a blending operation of the HDR blending circuitry 206 may include blending three or more exposures received from a pixel of the image sensor 202. For example, the HDR blending circuitry 206 may perform a blending of the exposures received in the pixel stream according to the blending operations and methods taught in U.S. patent application Ser. No. 14/534,068, filed Nov. 5, 2014, entitled "SYSTEMS AND METHODS FOR HIGH-DYNAMIC RANGE IMAGES," which is incorporated by reference as though set forth in full.

Finally, HDR pixel stream 208 is output from the HDR blending circuitry 206. In one embodiment, the HDR pixel stream 208 output from the HDR blending circuitry 206 may include any stream comprising one or more HDR pixels of one or more HDR images. For example, the HDR pixel stream 208 may include HDR pixels of a portion of a HDR image, an entirety of a HDR image, or more than one HDR image, such as multiple frames of a HDR video.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3A:
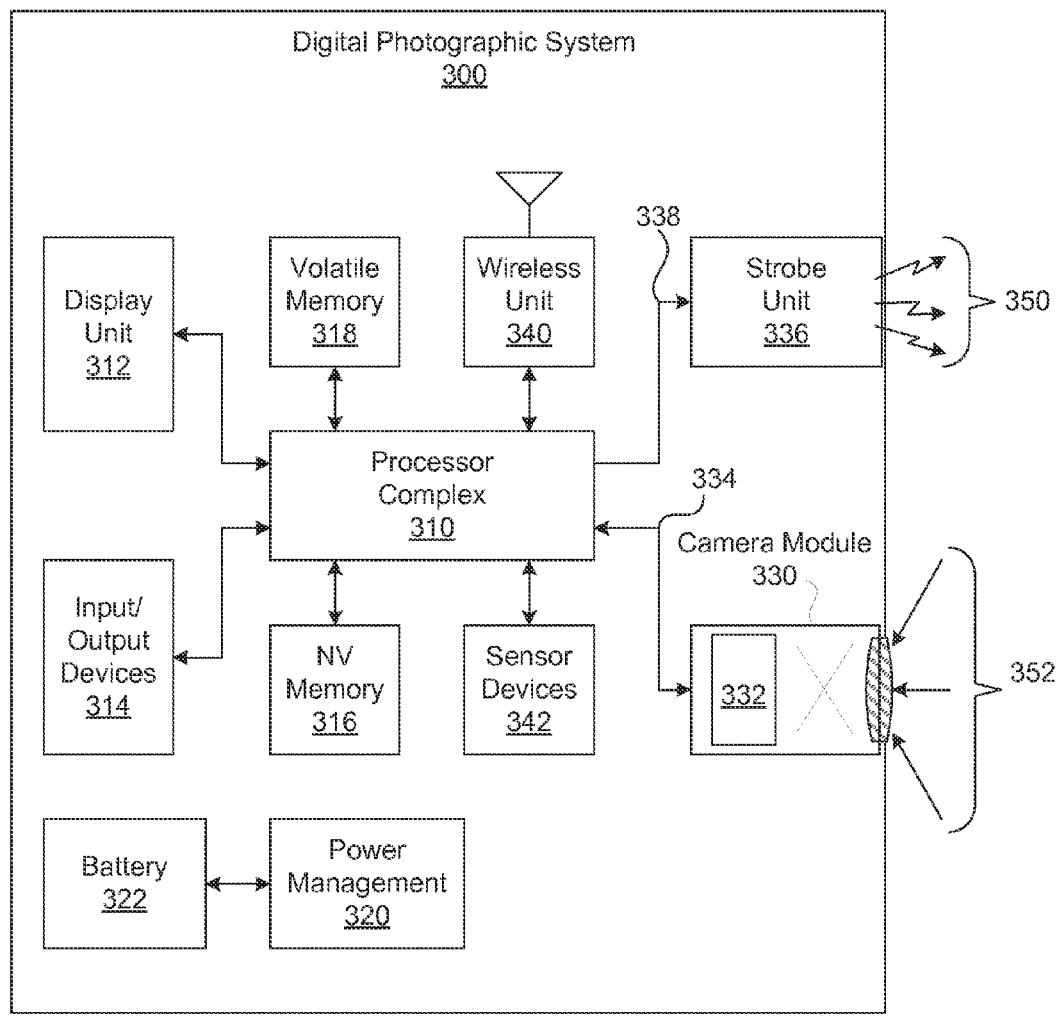
FIG. 3A illustrates a digital photographic system, in accordance with an embodiment.

FIG. 3A illustrates a digital photographic system 300, in accordance with one embodiment. As an option, the digital photographic system 300 may be implemented in the context of the details of any of the Figures disclosed herein. Of course, however, the digital photographic system 300 may be implemented in any desired environment. Further, the aforementioned definitions may equally apply to the description below.

As shown, the digital photographic system 300 may include a processor complex 310 coupled to a camera module 330 via an interconnect 334. In one embodiment, the processor complex 310 is coupled to a strobe unit 336. The digital photographic system 300 may also include, without limitation, a display unit 312, a set of input/output devices 314, non-volatile memory 316, volatile memory 318, a wireless unit 340, and sensor devices 342, each coupled to the processor complex 310. In one embodiment, a power management subsystem 320 is configured to generate appropriate power supply voltages for each electrical load element within the digital photographic system 300. A battery 322 may be configured to supply electrical energy to the power management subsystem 320. The battery 322 may implement any technically feasible energy storage system, including primary or rechargeable battery technologies. Of course, in other embodiments, additional or fewer features, units, devices, sensors, or subsystems may be included in the system.

In one embodiment, a strobe unit 336 may be integrated into the digital photographic system 300 and configured to provide strobe illumination 350 during an image sample event performed by the digital photographic system 300. In another embodiment, a strobe unit 336 may be implemented as an independent device from the digital photographic system 300 and configured to provide strobe illumination 350 during an image sample event performed by the digital photographic system 300. The strobe unit 336 may comprise one or more LED devices, a gas-discharge illuminator (e.g. a Xenon strobe device, a Xenon flash lamp, etc.), or any other technically feasible illumination device. In certain embodiments, two or more strobe units are configured to synchronously generate strobe illumination in conjunction with sampling an image. In one embodiment, the strobe unit 336 is controlled through a strobe control signal 338 to either emit the strobe illumination 350 or not emit the strobe illumination 350. The strobe control signal 338 may be implemented using any technically feasible signal transmission protocol. The strobe control signal 338 may indicate a strobe parameter (e.g. strobe intensity, strobe color, strobe time, etc.), for directing the strobe unit 336 to generate a specified intensity and/or color of the strobe illumination 350. The strobe control signal 338 may be generated by the processor complex 310, the camera module 330, or by any other technically feasible combination thereof. In one embodiment, the strobe control signal 338 is generated by a camera interface unit within the processor complex 310 and transmitted to both the strobe unit 336 and the camera module 330 via the interconnect 334. In another embodiment, the strobe control signal 338 is generated by the camera module 330 and transmitted to the strobe unit 336 via the interconnect 334.

Optical scene information 352, which may include at least a portion of the strobe illumination 350 reflected from objects in the photographic scene, is focused as an optical image onto an image sensor 332 within the camera module 330. The image sensor 332 generates an electronic representation of the optical image. The electronic representation comprises spatial color intensity information, which may include different color intensity samples (e.g. red, green, and blue light, etc.). In other embodiments, the spatial color intensity information may also include samples for white light. The electronic representation is transmitted to the processor complex 310 via the interconnect 334, which may implement any technically feasible signal transmission protocol.

In one embodiment, input/output devices 314 may include, without limitation, a capacitive touch input surface, a resistive tablet input surface, one or more buttons, one or more knobs, light-emitting devices, light detecting devices, sound emitting devices, sound detecting devices, or any other technically feasible device for receiving user input and converting the input to electrical signals, or converting electrical signals into a physical signal. In one embodiment, the input/output devices 314 include a capacitive touch input surface coupled to a display unit 312. A touch entry display system may include the display unit 312 and a capacitive touch input surface, also coupled to processor complex 310.

Additionally, in other embodiments, non-volatile (NV) memory 316 is configured to store data when power is interrupted. In one embodiment, the NV memory 316 comprises one or more flash memory devices (e.g. ROM, PCM, FeRAM, FRAM, PRAM, MRAM, NRAM, etc.). The NV memory 316 comprises a non-transitory computer-readable medium, which may be configured to include programming instructions for execution by one or more processing units within the processor complex 310. The programming instructions may implement, without limitation, an operating system (OS), UI software modules, image processing and storage software modules, one or more input/output devices 314 connected to the processor complex 310, one or more software modules for sampling an image stack through camera module 330, one or more software modules for presenting the image stack or one or more synthetic images generated from the image stack through the display unit 312. As an example, in one embodiment, the programming instructions may also implement one or more software modules for merging images or portions of images within the image stack, aligning at least portions of each image within the image stack, or a combination thereof. In another embodiment, the processor complex 310 may be configured to execute the programming instructions, which may implement one or more software modules operable to create a high dynamic range (HDR) image.

Still yet, in one embodiment, one or more memory devices comprising the NV memory 316 may be packaged as a module configured to be installed or removed by a user. In one embodiment, volatile memory 318 comprises dynamic random access memory (DRAM) configured to temporarily store programming instructions, image data such as data associated with an image stack, and the like, accessed during the course of normal operation of the digital photographic system 300. Of course, the volatile memory may be used in any manner and in association with any other input/output device 314 or sensor device 342 attached to the process complex 310.

In one embodiment, sensor devices 342 may include, without limitation, one or more of an accelerometer to detect motion and/or orientation, an electronic gyroscope to detect motion and/or orientation, a magnetic flux detector to detect orientation, a global positioning system (GPS) module to detect geographic position, or any combination thereof. Of course, other sensors, including but not limited to a motion detection sensor, a proximity sensor, an RGB light sensor, a gesture sensor, a 3-D input image sensor, a pressure sensor, and an indoor position sensor, may be integrated as sensor devices. In one embodiment, the sensor devices may be one example of input/output devices 314.

Wireless unit 340 may include one or more digital radios configured to send and receive digital data. In particular, the wireless unit 340 may implement wireless standards (e.g. WiFi, Bluetooth, NFC, etc.), and may implement digital cellular telephony standards for data communication (e.g.

CDMA, 3G, 4G, LTE, LTE-Advanced, etc.). Of course, any wireless standard or digital cellular telephony standards may be used.

In one embodiment, the digital photographic system 300 is configured to transmit one or more digital photographs to a network-based (online) or "cloud-based" photographic media service via the wireless unit 340. The one or more digital photographs may reside within either the NV memory 316 or the volatile memory 318, or any other memory device associated with the processor complex 310. In one embodiment, a user may possess credentials to access an online photographic media service and to transmit one or more digital photographs for storage to, retrieval from, and presentation by the online photographic media service. The credentials may be stored or generated within the digital photographic system 300 prior to transmission of the digital photographs. The online photographic media service may comprise a social networking service, photograph sharing service, or any other network-based service that provides storage of digital photographs, processing of digital photographs, transmission of digital photographs, sharing of digital photographs, or any combination thereof. In certain embodiments, one or more digital photographs are generated by the online photographic media service based on image data (e.g. image stack, HDR image stack, image package, etc.) transmitted to servers associated with the online photographic media service. In such embodiments, a user may upload one or more source images from the digital photographic system 300 for processing by the online photographic media service.

In one embodiment, the digital photographic system 300 comprises at least one instance of a camera module 330. In another embodiment, the digital photographic system 300 comprises a plurality of camera modules 330. Such an embodiment may also include at least one strobe unit 336 configured to illuminate a photographic scene, sampled as multiple views by the plurality of camera modules 330. The plurality of camera modules 330 may be configured to sample a wide angle view (e.g., greater than forty-five degrees of sweep among cameras) to generate a panoramic photograph. In one embodiment, a plurality of camera modules 330 may be configured to sample two or more narrow angle views (e.g., less than forty-five degrees of sweep among cameras) to generate a stereoscopic photograph. In other embodiments, a plurality of camera modules 330 may be configured to generate a 3-D image or to otherwise display a depth perspective (e.g. a z-component, etc.) as shown on the display unit 312 or any other display device.

In one embodiment, a display unit 312 may be configured to display a two-dimensional array of pixels to form an image for display. The display unit 312 may comprise a liquid-crystal (LCD) display, a light-emitting diode (LED) display, an organic LED display, or any other technically feasible type of display. In certain embodiments, the display unit 312 may be able to display a narrower dynamic range of image intensity values than a complete range of intensity values sampled from a photographic scene, such as within a single HDR image or over a set of two or more images comprising a multiple exposure or HDR image stack. In one embodiment, images comprising an image stack may be merged according to any technically feasible HDR blending technique to generate a synthetic image for display within dynamic range constraints of the display unit 312. In one embodiment, the limited dynamic range may specify an eight-bit per color channel binary representation of corresponding color intensities. In other embodiments, the limited dynamic range may specify more than eight-bits (e.g., 10 bits, 12 bits, or 14 bits, etc.) per color channel binary representation.

Figure 3B:
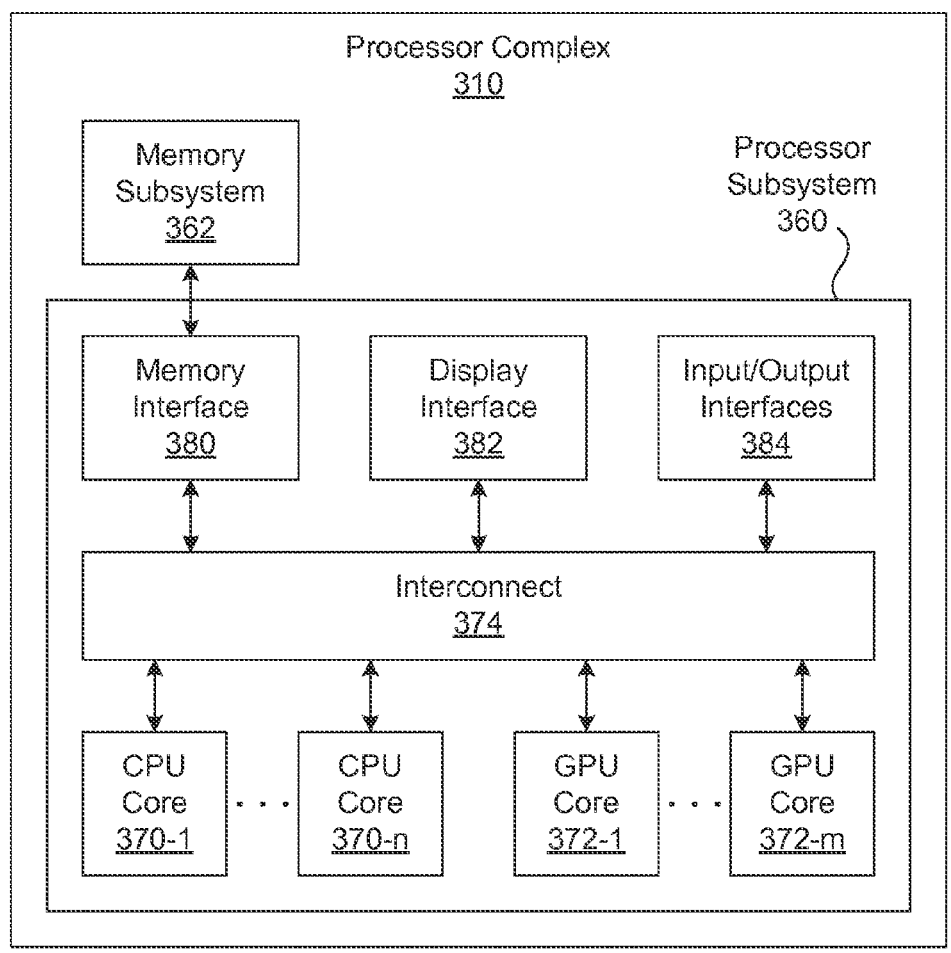
FIG. 3B illustrates a processor complex within the digital photographic system, according to one embodiment.

FIG. 3B illustrates a processor complex 310 within the digital photographic system 300 of FIG. 3A, in accordance with one embodiment. As an option, the processor complex 310 may be implemented in the context of the details of any of the Figures disclosed herein. Of course, however, the processor complex 310 may be implemented in any desired environment. Further, the aforementioned definitions may equally apply to the description below.

As shown, the processor complex 310 includes a processor subsystem 360 and may include a memory subsystem 362. In one embodiment, processor complex 310 may comprise a system on a chip (SoC) device that implements processor subsystem 360, and memory subsystem 362 comprises one or more DRAM devices coupled to the processor subsystem 360. In another embodiment, the processor complex 310 may comprise a multi-chip module (MCM) encapsulating the SoC device and the one or more DRAM devices comprising the memory subsystem 362.

The processor subsystem 360 may include, without limitation, one or more central processing unit (CPU) cores 370, a memory interface 380, input/output interfaces unit 384, and a display interface unit 382, each coupled to an interconnect 374. The one or more CPU cores 370 may be configured to execute instructions residing within the memory subsystem 362, volatile memory 318, NV memory 316, or any combination thereof. Each of the one or more CPU cores 370 may be configured to retrieve and store data through interconnect 374 and the memory interface 380. In one embodiment, each of the one or more CPU cores 370 may include a data cache, and an instruction cache. Additionally, two or more of the CPU cores 370 may share a data cache, an instruction cache, or any combination thereof. In one embodiment, a cache hierarchy is implemented to provide each CPU core 370 with a private cache layer, and a shared cache layer.

In some embodiments, processor subsystem 360 may include one or more graphics processing unit (GPU) cores 372. Each GPU core 372 may comprise a plurality of multi-threaded execution units that may be programmed to implement, without limitation, graphics acceleration functions. In various embodiments, the GPU cores 372 may be configured to execute multiple thread programs according to well-known standards (e.g. OpenGL™, WebGL™, OpenCL™, CUDA™, etc.), and/or any other programmable rendering graphic standard. In certain embodiments, at least one GPU core 372 implements at least a portion of a motion estimation function, such as a well-known Harris detector or a well-known Hessian-Laplace detector. Such a motion estimation function may be used at least in part to align images or portions of images within an image stack. For example, in one embodiment, an HDR image may be compiled based on an image stack, where two or more images are first aligned prior to compiling the HDR image.

As shown, the interconnect 374 is configured to transmit data between and among the memory interface 380, the display interface unit 382, the input/output interfaces unit 384, the CPU cores 370, and the GPU cores 372. In various embodiments, the interconnect 374 may implement one or more buses, one or more rings, a cross-bar, a mesh, or any other technically feasible data transmission structure or technique. The memory interface 380 is configured to couple the memory subsystem 362 to the interconnect 374. The memory interface 380 may also couple NV memory 316, volatile memory 318, or any combination thereof to the interconnect 374. The display interface unit 382 may be configured to couple a display unit 312 to the interconnect 374. The display interface unit 382 may implement certain frame buffer functions (e.g. frame refresh, etc.). Alternatively, in another embodiment, the display unit 312 may implement certain frame buffer functions (e.g. frame refresh, etc.). The input/output interfaces unit 384 may be configured to couple various input/output devices to the interconnect 374.

In certain embodiments, a camera module 330 is configured to store exposure parameters for sampling each image associated with an image stack. For example, in one embodiment, when directed to sample a photographic scene, the camera module 330 may sample a set of images comprising the image stack according to stored exposure parameters. A software module comprising programming instructions executing within a processor complex 310 may generate and store the exposure parameters prior to directing the camera module 330 to sample the image stack. In other embodiments, the camera module 330 may be used to meter an image or an image stack, and the software module comprising programming instructions executing within a processor complex 310 may generate and store metering parameters prior to directing the camera module 330 to capture the image. Of course, the camera module 330 may be used in any manner in combination with the processor complex 310.

In one embodiment, exposure parameters associated with images comprising the image stack may be stored within an exposure parameter data structure that includes exposure parameters for one or more images. In another embodiment, a camera interface unit (not shown in FIG. 3B) within the processor complex 310 may be configured to read exposure parameters from the exposure parameter data structure and to transmit associated exposure parameters to the camera module 330 in preparation of sampling a photographic scene. After the camera module 330 is configured according to the exposure parameters, the camera interface may direct the camera module 330 to sample the photographic scene; the camera module 330 may then generate a corresponding image stack. The exposure parameter data structure may be stored within the camera interface unit, a memory circuit within the processor complex 310, volatile memory 318, NV memory 316, the camera module 330, or within any other technically feasible memory circuit. Further, in another embodiment, a software module executing within processor complex 310 may generate and store the exposure parameter data structure.

Figure 3C:
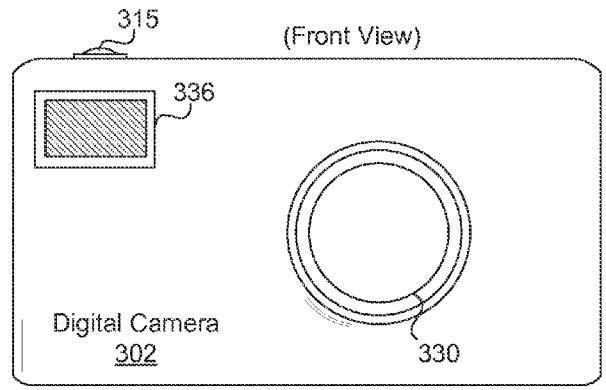
FIG. 3C illustrates a digital camera, in accordance with an embodiment.

FIG. 3C illustrates a digital camera 302, in accordance with one embodiment. As an option, the digital camera 302 may be implemented in the context of the details of any of the Figures disclosed herein. Of course, however, the digital camera 302 may be implemented in any desired environment. Further, the aforementioned definitions may equally apply to the description below.

In one embodiment, the digital camera 302 may be configured to include a digital photographic system, such as digital photographic system 300 of FIG. 3A. As shown, the digital camera 302 includes a camera module 330, which may include optical elements configured to focus optical scene information representing a photographic scene onto an image sensor, which may be configured to convert the optical scene information to an electronic representation of the photographic scene.

Additionally, the digital camera 302 may include a strobe unit 336, and may include a shutter release button 315 for triggering a photographic sample event, whereby digital camera 302 samples one or more images comprising the electronic representation. In other embodiments, any other technically feasible shutter release mechanism may trigger the photographic sample event (e.g. such as a timer trigger or remote control trigger, etc.).

Figure 3D:
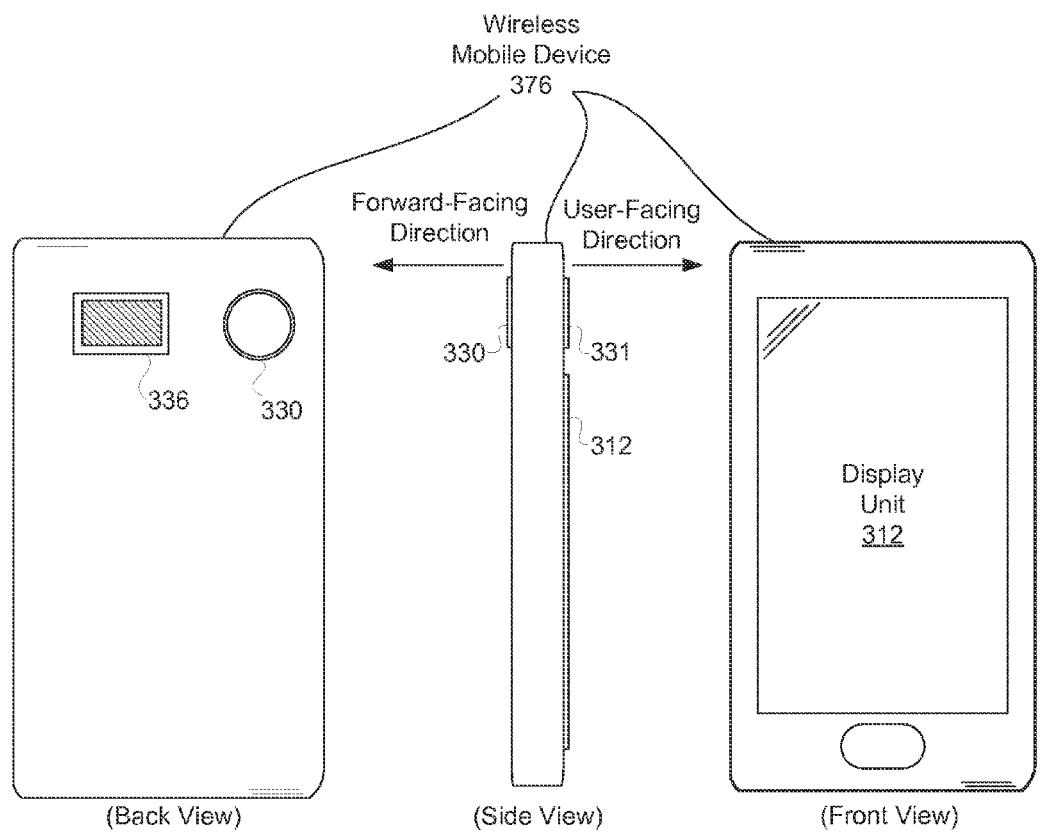
FIG. 3D illustrates a wireless mobile device, in accordance with another embodiment.

FIG. 3D illustrates a wireless mobile device 376, in accordance with one embodiment. As an option, the mobile device 376 may be implemented in the context of the details of any of the Figures disclosed herein. Of course, however, the mobile device 376 may be implemented in any desired environment. Further, the aforementioned definitions may equally apply to the description below.

In one embodiment, the mobile device 376 may be configured to include a digital photographic system (e.g. such as digital photographic system 300 of FIG. 3A), which is configured to sample a photographic scene. In various embodiments, a camera module 330 may include optical elements configured to focus optical scene information representing the photographic scene onto an image sensor, which may be configured to convert the optical scene information to an electronic representation of the photographic scene. Further, a shutter release command may be generated through any technically feasible mechanism, such as a virtual button, which may be activated by a touch gesture on a touch entry display system comprising display unit 312, or a physical button, which may be located on any face or surface of the mobile device 376. Of course, in other embodiments, any number of other buttons, external inputs/outputs, or digital inputs/outputs may be included on the mobile device 376, and which may be used in conjunction with the camera module 330.

As shown, in one embodiment, a touch entry display system comprising display unit 312 is disposed on the opposite side of mobile device 376 from camera module 330. In certain embodiments, the mobile device 376 includes a user-facing camera module 331 and may include a user-facing strobe unit (not shown). Of course, in other embodiments, the mobile device 376 may include any number of user-facing camera modules or rear-facing camera modules, as well as any number of user-facing strobe units or rear-facing strobe units.

In some embodiments, the digital camera 302 and the mobile device 376 may each generate and store a synthetic image based on an image stack sampled by camera module 330. The image stack may include one or more images sampled under ambient lighting conditions, one or more images sampled under strobe illumination from strobe unit 336, or a combination thereof.

Figure 3E:
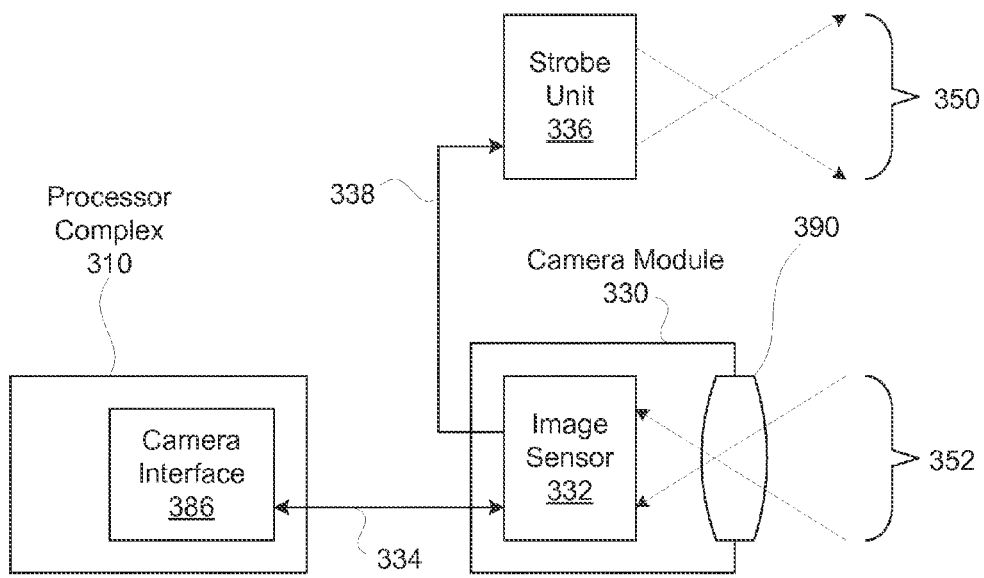
FIG. 3E illustrates a camera module configured to sample an image, according to one embodiment.

FIG. 3E illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to control strobe unit 336 through strobe control signal 338. As shown, a lens 390 is configured to focus optical scene information 352 onto image sensor 332 to be sampled. In one embodiment, image sensor 332 advantageously controls detailed timing of the strobe unit 336 though the strobe control signal 338 to reduce inter-sample time between an image sampled with the strobe unit 336 enabled, and an image sampled with the strobe unit 336 disabled. For example, the image sensor 332 may enable the strobe unit 336 to emit strobe illumination 350 less than one microsecond (or any desired length) after image sensor 332 completes an exposure time associated with sampling an ambient image and prior to sampling a strobe image.

In other embodiments, the strobe illumination 350 may be configured based on a desired one or more target points. For example, in one embodiment, the strobe illumination 350 may light up an object in the foreground, and depending on the length of exposure time, may also light up an object in the background of the image. In one embodiment, once the strobe unit 336 is enabled, the image sensor 332 may then immediately begin exposing a strobe image. The image sensor 332 may thus be able to directly control sampling operations, including enabling and disabling the strobe unit 336 associated with generating an image stack, which may comprise at least one image sampled with the strobe unit 336 disabled, and at least one image sampled with the strobe unit 336 either enabled or disabled. In one embodiment, data comprising the image stack sampled by the image sensor 332 is transmitted via interconnect 334 to a camera interface unit 386 within processor complex 310. In some embodiments, the camera module 330 may include an image sensor controller, which may be configured to generate the strobe control signal 338 in conjunction with controlling operation of the image sensor 332.

Figure 3F:
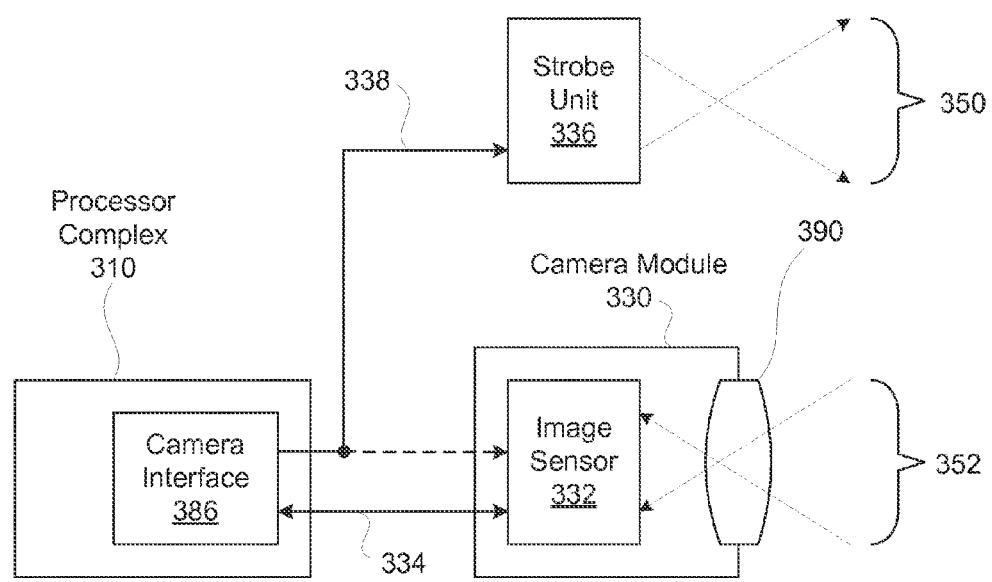
FIG. 3F illustrates a camera module configured to sample an image, according to another embodiment.

FIG. 3F illustrates a camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to sample an image based on state information for strobe unit 336. The state information may include, without limitation, one or more strobe parameters (e.g. strobe intensity, strobe color, strobe time, etc.), for directing the strobe unit 336 to generate a specified intensity and/or color of the strobe illumination 350. In one embodiment, commands for configuring the state information associated with the strobe unit 336 may be transmitted through a strobe control signal 338, which may be monitored by the camera module 330 to detect when the strobe unit 336 is enabled. For example, in one embodiment, the camera module 330 may detect when the strobe unit 336 is enabled or disabled within a microsecond or less of the strobe unit 336 being enabled or disabled by the strobe control signal 338. To sample an image requiring strobe illumination, a camera interface unit 386 may enable the strobe unit 336 by sending an enable command through the strobe control signal 338. In one embodiment, the camera interface unit 386 may be included as an interface of input/output interfaces 384 in a processor subsystem 360 of the processor complex 310 of FIG. 3B The enable command may comprise a signal level transition, a data packet, a register write, or any other technically feasible transmission of a command. The camera module 330 may sense that the strobe unit 336 is enabled and then cause image sensor 332 to sample one or more images requiring strobe illumination while the strobe unit 336 is enabled. In such an implementation, the image sensor 332 may be configured to wait for an enable signal destined for the strobe unit 336 as a trigger signal to begin sampling a new exposure.

In one embodiment, camera interface unit 386 may transmit exposure parameters and commands to camera module 330 through interconnect 334. In certain embodiments, the camera interface unit 386 may be configured to directly control strobe unit 336 by transmitting control commands to the strobe unit 336 through strobe control signal 338. By directly controlling both the camera module 330 and the strobe unit 336, the camera interface unit 386 may cause the camera module 330 and the strobe unit 336 to perform their respective operations in precise time synchronization. In one embodiment, precise time synchronization may be less than five hundred microseconds of event timing error. Additionally, event timing error may be a difference in time from an intended event occurrence to the time of a corresponding actual event occurrence.

In another embodiment, camera interface unit 386 may be configured to accumulate statistics while receiving image data from camera module 330. In particular, the camera interface unit 386 may accumulate exposure statistics for a given image while receiving image data for the image through interconnect 334. Exposure statistics may include, without limitation, one or more of an intensity histogram, a count of over-exposed pixels, a count of under-exposed pixels, an intensity-weighted sum of pixel intensity, or any combination thereof. The camera interface unit 386 may present the exposure statistics as memory-mapped storage locations within a physical or virtual address space defined by a processor, such as one or more of CPU cores 370, within processor complex 310. In one embodiment, exposure statistics reside in storage circuits that are mapped into a memory-mapped register space, which may be accessed through the interconnect 334. In other embodiments, the exposure statistics are transmitted in conjunction with transmitting pixel data for a captured image. For example, the exposure statistics for a given image may be transmitted as in-line data, following transmission of pixel intensity data for the captured image. Exposure statistics may be calculated, stored, or cached within the camera interface unit 386.

In one embodiment, camera interface unit 386 may accumulate color statistics for estimating scene white-balance. Any technically feasible color statistics may be accumulated for estimating white balance, such as a sum of intensities for different color channels comprising red, green, and blue color channels. The sum of color channel intensities may then be used to perform a white-balance color correction on an associated image, according to a white-balance model such as a gray-world white-balance model. In other embodiments, curve-fitting statistics are accumulated for a linear or a quadratic curve fit used for implementing white-balance correction on an image.

In one embodiment, camera interface unit 386 may accumulate spatial color statistics for performing color-matching between or among images, such as between or among an ambient image and one or more images sampled with strobe illumination. As with the exposure statistics, the color statistics may be presented as memory-mapped storage locations within processor complex 310. In one embodiment, the color statistics are mapped in a memory-mapped register space, which may be accessed through interconnect 334, within processor subsystem 360. In other embodiments, the color statistics may be transmitted in conjunction with transmitting pixel data for a captured image. For example, in one embodiment, the color statistics for a given image may be transmitted as in-line data, following transmission of pixel intensity data for the image. Color statistics may be calculated, stored, or cached within the camera interface 386.

In one embodiment, camera module 330 may transmit strobe control signal 338 to strobe unit 336, enabling the strobe unit 336 to generate illumination while the camera module 330 is sampling an image. In another embodiment, camera module 330 may sample an image illuminated by strobe unit 336 upon receiving an indication signal from camera interface unit 386 that the strobe unit 336 is enabled. In yet another embodiment, camera module 330 may sample an image illuminated by strobe unit 336 upon detecting strobe illumination within a photographic scene via a rapid rise in scene illumination. In one embodiment, a rapid rise in scene illumination may include at least a rate of increasing intensity consistent with that of enabling strobe unit 336. In still yet another embodiment, camera module 330 may enable strobe unit 336 to generate strobe illumination while sampling one image, and disable the strobe unit 336 while sampling a different image.

Figure 3G:
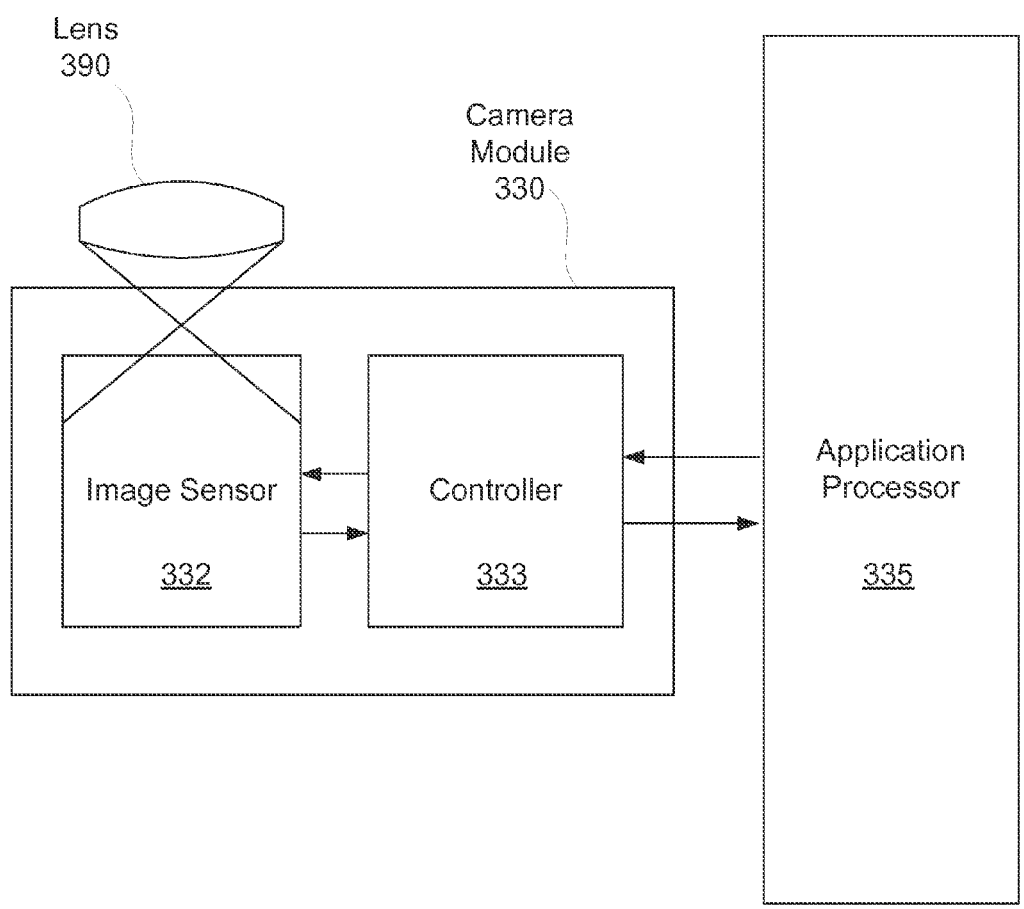
FIG. 3G illustrates a camera module in communication with an application processor, in accordance with an embodiment.

FIG. 3G illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be in communication with an application processor 335. The camera module 330 is shown to include image sensor 332 in communication with a controller 333. Further, the controller 333 is shown to be in communication with the application processor 335.

In one embodiment, the application processor 335 may reside outside of the camera module 330. As shown, the lens 390 may be configured to focus optical scene information onto image sensor 332 to be sampled. The optical scene information sampled by the image sensor 332 may then be communicated from the image sensor 332 to the controller 333 for at least one of subsequent processing and communication to the application processor 335. In another embodiment, the controller 333 may control storage of the optical scene information sampled by the image sensor 332, or storage of processed optical scene information.

In another embodiment, the controller 333 may enable a strobe unit to emit strobe illumination for a short time duration (e.g. less than one microsecond, etc.) after image sensor 332 completes an exposure time associated with sampling an ambient image. Further, the controller 333 may be configured to generate strobe control signal 338 in conjunction with controlling operation of the image sensor 332.

In one embodiment, the image sensor 332 may be a complementary metal oxide semiconductor (CMOS) sensor or a charge-coupled device (CCD) sensor. In another embodiment, the controller 333 and the image sensor 332 may be packaged together as an integrated system or integrated circuit. In yet another embodiment, the controller 333 and the image sensor 332 may comprise discrete packages. In one embodiment, the controller 333 may provide circuitry for receiving optical scene information from the image sensor 332, processing of the optical scene information, timing of various functionalities, and signaling associated with the application processor 335. Further, in another embodiment, the controller 333 may provide circuitry for control of one or more of exposure, shuttering, white balance, and gain adjustment. Processing of the optical scene information by the circuitry of the controller 333 may include one or more of gain application, amplification, and analog-to-digital conversion. After processing the optical scene information, the controller 333 may transmit corresponding digital pixel data, such as to the application processor 335.

In one embodiment, the application processor 335 may be implemented on processor complex 310 and at least one of volatile memory 318 and NV memory 316, or any other memory device and/or system. The application processor 335 may be previously configured for processing of received optical scene information or digital pixel data communicated from the camera module 330 to the application processor 335.

Figure 4:
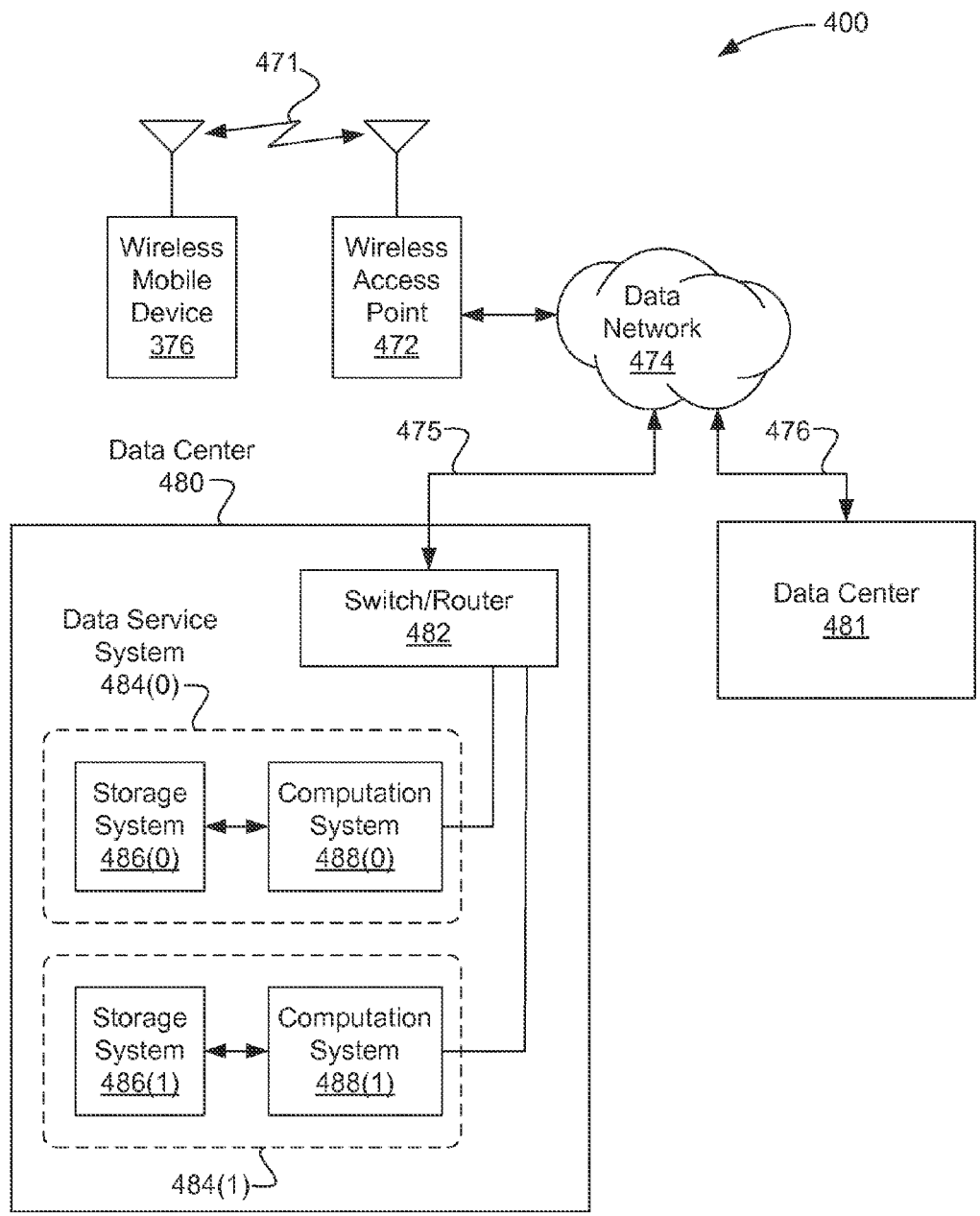
FIG. 4 illustrates a network service system, in accordance with another embodiment.

FIG. 4 illustrates a network service system 400, in accordance with one embodiment. As an option, the network service system 400 may be implemented in the context of the details of any of the Figures disclosed herein. Of course, however, the network service system 400 may be implemented in any desired environment. Further, the aforementioned definitions may equally apply to the description below.

In one embodiment, the network service system 400 may be configured to provide network access to a device implementing a digital photographic system. As shown, network service system 400 includes a wireless mobile device 376, a wireless access point 472, a data network 474, data center 480, and a data center 481. The wireless mobile device 376 may communicate with the wireless access point 472 via a digital radio link 471 to send and receive digital data, including data associated with digital images. The wireless mobile device 376 and the wireless access point 472 may implement any technically feasible transmission techniques for transmitting digital data via digital a radio link 471 without departing the scope and spirit of the present invention. In certain embodiments, one or more of data centers 480, 481 may be implemented using virtual constructs so that each system and subsystem within a given data center 480, 481 may comprise virtual machines configured to perform specified data processing and network tasks. In other implementations, one or more of data centers 480, 481 may be physically distributed over a plurality of physical sites.

The wireless mobile device 376 may comprise a smart phone configured to include a digital camera, a digital camera configured to include wireless network connectivity, a reality augmentation device, a laptop configured to include a digital camera and wireless network connectivity, or any other technically feasible computing device configured to include a digital photographic system and wireless network connectivity.

In various embodiments, the wireless access point 472 may be configured to communicate with wireless mobile device 376 via the digital radio link 471 and to communicate with the data network 474 via any technically feasible transmission media, such as any electrical, optical, or radio transmission media. For example, in one embodiment, wireless access point 472 may communicate with data network 474 through an optical fiber coupled to the wireless access point 472 and to a router system or a switch system within the data network 474. A network link 475, such as a wide area network (WAN) link, may be configured to transmit data between the data network 474 and the data center 480.

In one embodiment, the data network 474 may include routers, switches, long-haul transmission systems, provisioning systems, authorization systems, and any technically feasible combination of communications and operations subsystems configured to convey data between network endpoints, such as between the wireless access point 472 and the data center 480. In one implementation, a wireless the mobile device 376 may comprise one of a plurality of wireless mobile devices configured to communicate with the data center 480 via one or more wireless access points coupled to the data network 474.

Additionally, in various embodiments, the data center 480 may include, without limitation, a switch/router 482 and at least one data service system 484. The switch/router 482 may be configured to forward data traffic between and among a network link 475, and each data service system 484. The switch/router 482 may implement any technically feasible transmission techniques, such as Ethernet media layer transmission, layer 2 switching, layer 3 routing, and the like. The switch/router 482 may comprise one or more individual systems configured to transmit data between the data service systems 484 and the data network 474.

In one embodiment, the switch/router 482 may implement session-level load balancing among a plurality of data service systems 484. Each data service system 484 may include at least one computation system 488 and may also include one or more storage systems 486. Each computation system 488 may comprise one or more processing units, such as a central processing unit, a graphics processing unit, or any combination thereof. A given data service system 484 may be implemented as a physical system comprising one or more physically distinct systems configured to operate together. Alternatively, a given data service system 484 may be implemented as a virtual system comprising one or more virtual systems executing on an arbitrary physical system. In certain scenarios, the data network 474 may be configured to transmit data between the data center 480 and another data center 481, such as through a network link 476.

In another embodiment, the network service system 400 may include any networked mobile devices configured to implement one or more embodiments of the present invention. For example, in some embodiments, a peer-to-peer network, such as an ad-hoc wireless network, may be established between two different wireless mobile devices. In such embodiments, digital image data may be transmitted between the two wireless mobile devices without having to send the digital image data to a data center 480.

Figure 5:
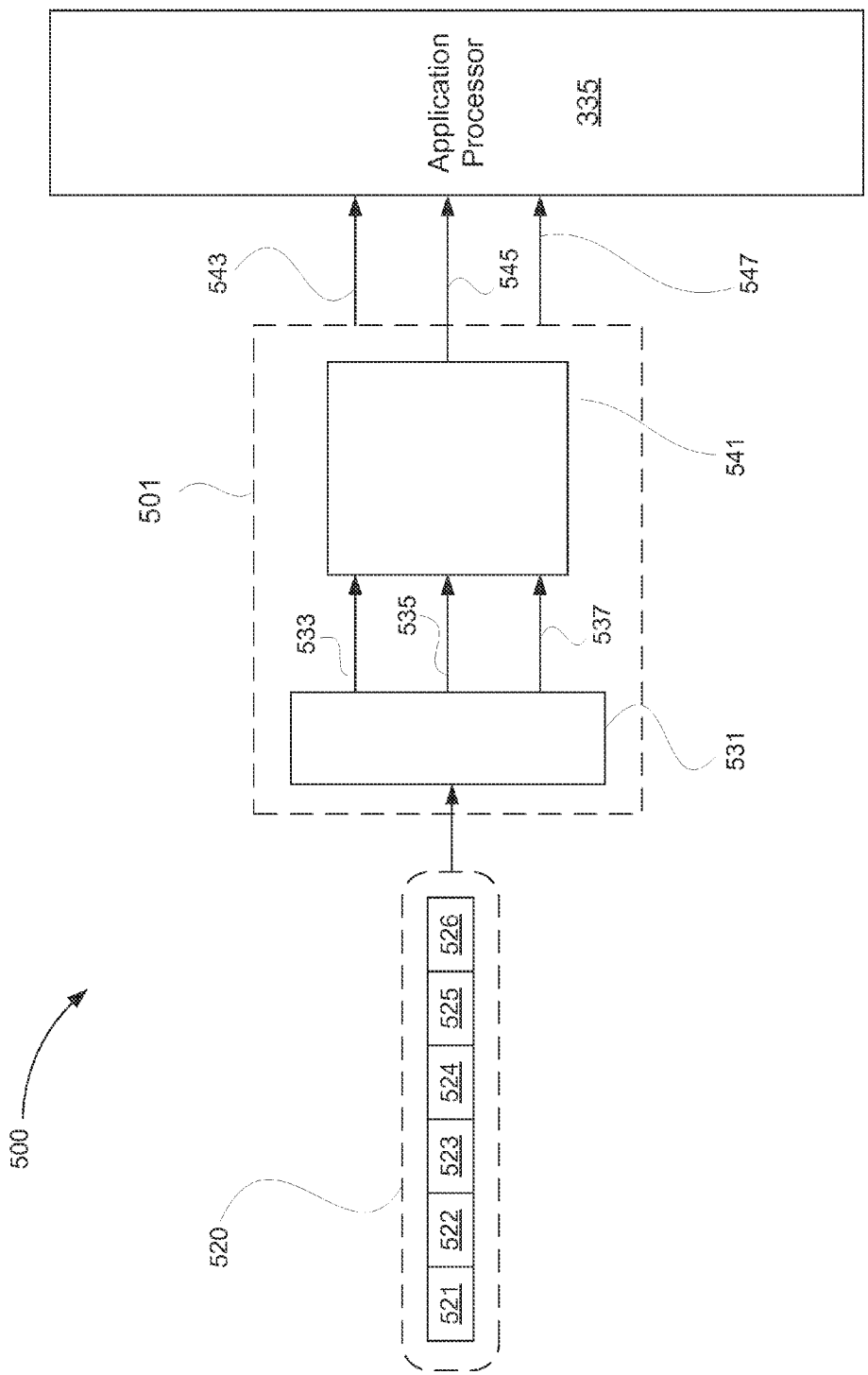
FIG. 5 illustrates a system for receiving a pixel stream and outputting a HDR pixel stream, in accordance with another embodiment.

FIG. 5 illustrates a system 500 for receiving a pixel stream and outputting an HDR pixel stream, in accordance with an embodiment. As an option, the system 500 may be implemented in the context of any of the Figures. Of course, however, the system 500 may be implemented in any desired environment. Further, the aforementioned definitions may equally apply to the description below.

As shown, the system 500 includes a blending circuitry 501 receiving a pixel stream 520, and outputting at least one instance of a HDR pixel data 545 to an application processor 335. The blending circuitry 501 is shown to include a buffer 531 and a HDR pixel generator 541. In one embodiment, the pixel stream 520 may be received from an image sensor, such as the image sensor 332 of FIG. 3G. For example, the pixel stream 520 may be received from an interface of the image sensor 332. In another embodiment, the pixel stream 520 may be received from a controller, such as the controller 333 of FIG. 3G. For example, the pixel stream 520 may be received from an interface of the controller 333. The application processor 335 of FIG. 5 may be substantially identical to the application processor 335 of FIG. 3G. Accordingly, the blending circuitry 501 may be operative to intercept a signal comprising the pixel data 520 as the pixel data 520 is being transmitted from an image sensor to the application processor 335.

As illustrated in FIG. 5, the pixel stream 520 is shown to include digital pixel data units 521-526. Each of the digital pixel data units 521-526 may comprise digital pixel data for one or more pixels of an image sensor. In one embodiment, each of the digital pixel data units 521-526 may include digital pixel data representative of light measured or sampled at a single pixel of an image sensor. In another embodiment, each of the digital pixel data units 521-526 may comprise digital pixel data for more than one pixel of an image sensor, such as for a line of pixels of an image sensor. In yet another embodiment, each of the digital pixel data units 521-526 may comprise digital pixel data for a frame of pixels of an image sensor.

In the various embodiments, the digital pixel data units 521-526 may be interleaved by pixel, line, or frame from of the image sensor. For example, in one embodiment, the pixel stream 520 may be output such that it includes digital pixel data for multiple pixels in a sequence at a first exposure, and then includes digital pixel data for the multiple pixels in the sequence at a second exposure. The multiple pixels in the sequence may comprise at least a portion of a line of pixels of an image sensor. In another embodiment, the pixel stream 520 may be output such that it includes digital pixel data comprising a sequence of different exposures of a single pixel, and then a sequence of different exposures of another single pixel.

As an example, in an embodiment where the pixel stream 520 includes two exposures per pixel of a plurality of pixels of an image sensor, a digital pixel data unit 521 may include first digital pixel data for a first pixel of the image sensor, a digital pixel data unit 522 may include second digital pixel data for the first pixel of the image sensor, a digital pixel data unit 523 may include first digital pixel data for a second pixel of the image sensor, a digital pixel data unit 524 may include second digital pixel data for the second pixel of the image sensor, a digital pixel data unit 525 may include first digital pixel data for a third pixel of the image sensor, and a digital pixel data unit 526 may include second digital pixel data for the third pixel of the image sensor. In such an example, each set of digital pixel data may be associated with a different exposure, such that each first digital pixel data is associated with a first exposure, and each second digital pixel data is associated with a second exposure different than the first exposure.

As another example, in an embodiment where the pixel stream 520 includes three exposures per pixel of a plurality of pixels of an image sensor, a digital pixel data unit 521 may include first digital pixel data for a first pixel of the image sensor, a digital pixel data unit 522 may include second digital pixel data for the first pixel of the image sensor, a digital pixel data unit 523 may include third digital pixel data for the first pixel of the image sensor, a digital pixel data unit 524 may include first digital pixel data for a second pixel of the image sensor, a digital pixel data unit 525 may include second digital pixel data for second pixel of the image sensor, and a digital pixel data unit 526 may include third digital pixel data for the second pixel of the image sensor. In such an example, each set of digital pixel data may be associated with a different exposure, such that each first digital pixel data is associated with a first exposure, each second digital pixel data is associated with a second exposure different than the first exposure, and each third digital pixel data is associated with a third exposure different than the first exposure and the second exposure.

As yet another example, in an embodiment where the pixel stream 520 includes two exposures per pixel of a plurality of pixels of an image sensor, and the pixel stream 520 is interleaved by groups of pixels, a digital pixel data unit 521 may include first digital pixel data for a first plurality of pixels of the image sensor, a digital pixel data unit 522 may include second digital pixel data for the first plurality of pixels of the image sensor, a digital pixel data unit 523 may include first digital pixel data for a second plurality of pixels of the image sensor, a digital pixel data unit 524 may include second digital pixel data for the second plurality of pixels of the image sensor, a digital pixel data unit 525 may include first digital pixel data for a third plurality of pixels of the image sensor, and a digital pixel data unit 526 may include second digital pixel data for the third plurality of pixels of the image sensor. In such an example, each plurality of pixels may include a line of pixels, such that the first plurality of pixels comprise a first line of pixels, the second plurality of pixels comprises a second line of pixels, and the third plurality of pixels comprises a third line of pixels. Further, each set of digital pixel data may be associated with a different exposure, such that each first digital pixel data is associated with a first exposure, and each second digital pixel data is associated with a second exposure different than the first exposure.

As still another example, in an embodiment where the pixel stream 520 includes three exposures per pixel of a plurality of pixels of an image sensor, and the pixel stream 520 is interleaved by groups of pixels, a digital pixel data unit 521 may include first digital pixel data for a first plurality of pixels of the image sensor, a digital pixel data unit 522 may include second digital pixel data for the first plurality of pixels of the image sensor, a digital pixel data unit 523 may include third digital pixel data for the first plurality of pixels of the image sensor, a digital pixel data unit 524 may include first digital pixel data for a second plurality of pixels of the image sensor, a digital pixel data unit 525 may include second digital pixel data for the second plurality of pixels of the image sensor, and digital pixel data unit 526 may include third digital pixel data for the second plurality of pixels of the image sensor. In such an example, each plurality of pixels may include a line of pixels, such that the first plurality of pixels comprises a first line of pixels, and the second plurality of pixels comprises a second line of pixels. Further, each set of digital pixel data may be associated with a different exposure, such that each first digital pixel data is associated with a first exposure, each second digital pixel data is associated with a second exposure different than the first exposure, and each third digital pixel data is associated with a third exposure different than the first exposure and the second exposure.

As shown in FIG. 5, the buffer 531 of the blending circuitry 501 is operative to receive the pixel stream 520. In one embodiment, the buffer 531 is operative to de-interleave the pixel stream. In another embodiment, the buffer 531 may be operative to identify each exposure of a particular pixel of the image sensor. For example, for a given pixel of a plurality of pixels of an image sensor, the buffer 531 may identify at least two different exposures of the pixel. More specifically, the buffer 531 may identify a first exposure of the pixel from a first unit of digital pixel data, and identify a second exposure of the pixel from a second unit of digital pixel data. Similarly, in embodiments including three exposures per pixel, the buffer 531 may identify a first exposure of the pixel from a first unit of digital pixel data, identify a second exposure of the pixel from a second unit of digital pixel data, and identify a third exposure of the pixel from a third unit of digital pixel data. To this end, the buffer may identify at least two exposures of a single pixel of a pixel array of an image sensor.

In an embodiment in which lines are interleaved in the pixel stream 520, the buffer 531 may receive two or more digital pixel data units of a same line, where each digital pixel data unit is associated with a different exposure of the line. Further, the buffer 531 may then identify and select pixel data at each exposure for a given pixel in the line. In such an embodiment, pixel data that is not associated with the given pixel may be temporarily stored. Further, pixel data that is temporarily stored may be utilized for identifying and selecting pixel data at each of the exposures for another given pixel in the line. This process of pixel data storage and pixel data retrieval may repeat for each pixel in the line.

As used herein, pixel data for a pixel may describe a set of components of a color space, such as red, green, and blue in RGB color space; or cyan, magenta, yellow, and black, in CMYK color space. Further, an intensity of each of the color components may be variable, and may be described using one or more values for each component. Thus, in one embodiment, pixel data for a given exposure of a pixel may include the one or more values for the color components of the pixel at the given exposure. Further, the one or more values for the color components of a pixel may be utilized to calculate various attributes of the pixel in addition to color, such as, for example, saturation, brightness, hue, luminance, etc.

After identifying at least two exposures of a given pixel, the buffer 531 may then output first exposure pixel data 533 for the given pixel, second exposure pixel data 535 for the given pixel, and third exposure pixel data 537 for the given pixel. As shown in FIG. 5, each of the first exposure pixel data 533, the second exposure pixel data 535, and the third exposure pixel data 537 are output from the buffer 531 to the HDR pixel generator 541. Of course, in other embodiments, a buffer 531 may output, to a HDR pixel generator 541, pixel data for only two exposures of the pixel, or for more than three exposures of the pixel.

The buffer 531 may be operative to identify pixel data of the two or more exposures of a given pixel in a line while saving received digital pixel data for remaining pixels of the line, as well as other lines, for subsequent processing. For example, if the buffer 531 receives first pixel data for a given line, second pixel data for the given line, and third pixel data for the given line, where each of the units of pixel data corresponds to a different exposure of the given line, the buffer 531 may be operative to identify a portion of pixel data associated with a first pixel in each of the received pixel data units. For example, the buffer 531 may identify a first exposure of the pixel, a second exposure of the pixel, and a third exposure of the pixel. Further, the buffer 531 may be operative to store unselected pixel data received in each unit of pixel data, and subsequently identify pixel data associated with a second pixel in each of the received pixel data units. For example, the buffer 531 may identify a first exposure of a second pixel adjacent to the first pixel, a second exposure of the second pixel, and a third exposure of the second pixel. To this end, the buffer 531 may be operative to identify each exposure of a plurality of exposures of each of the pixels of a line.

Referring again to FIG. 5, the buffer 531 is shown to output each of the first exposure pixel data 533, the second exposure pixel data 535, and the third exposure pixel data 537 to the HDR pixel generator 541. As noted above, each of the first exposure pixel data 533, the second exposure pixel data 535, and the third exposure pixel data 537 may comprise pixel data for different exposures of the same pixel.

In one embodiment, each exposure of a pixel may be characterized as having an exposure value (EV). In such an embodiment, an exposure of the pixel may be characterized as being obtained at exposure value 0 (EV0), wherein the EV0 exposure is characterized as being captured utilizing a first collection of capture parameters. Such capture parameters may include ISO or light sensitivity, aperture, shutter speed or sampling time, or any other parameter associated with image capture that may be controlled or modulated. The pixel characterized as captured at EV0 may be captured using a particular combination of capture parameters, such as a particular ISO and a particular shutter speed.

Further, an exposure of another capture or sample of the pixel may be selected based on the capture parameters of the EV0 pixel. More specifically, the other capture or sample of the pixel may be selected to have an increased or decreased exposure in comparison to the exposure of the EV0 pixel. For example, an ISO capture parameter of the other sample of the pixel may be selected such that the exposure is increased or decreased with respect to the exposure of the EV0 pixel. Still yet, an exposure time capture parameter of the other sample of the pixel may be selected such that the exposure time is increased or decreased with respect to the exposure time of the EV0 pixel. As a specific example, the other sample of the pixel may be captured at an increased exposure when it is captured using a faster ISO and the same exposure time, or using a greater exposure time at the same ISO, with respect to the EV0 pixel. In such an embodiment, the other capture or exposure of the pixel may be referred to as an EV+ exposure, or an EV+ pixel. Similarly, the other sample of the pixel may be captured at a decreased exposure when it is captured using a slower ISO and the same exposure time, or using a reduced exposure time at the same ISO, with respect to the EV0 pixel. In such an embodiment, the other capture or exposure of the pixel may be referred to as an EV− exposure, or an EV− pixel.

In some embodiments, different exposures of a given pixel may be controlled based on an ISO value associated with the pixel during or following a capture operation, where the ISO value may be mapped to one or more gains that may be applied to an analog signal output from an image sensor during the capture operation. Such embodiments are described in more depth in U.S. patent application Ser. No. 14/534,079, filed Nov. 5, 2014, entitled "IMAGE SENSOR APPARATUS AND METHOD FOR OBTAINING MULTIPLE EXPOSURES WITH ZERO INTERFRAME TIME," which is incorporated herein as though set forth in full.

In yet other embodiments, different exposures of a given pixel may be obtained by controlling exposure times for two or more sampling operations that occur simultaneously or concurrently at the pixel. Such embodiments are described in more depth in application Ser. No. 14/534,089, filed Nov. 5, 2014, entitled "IMAGE SENSOR APPARATUS AND METHOD FOR SIMULTANEOUSLY CAPTURING MULTIPLE IMAGES"; or application Ser. No. 14/535,274, filed Nov. 6, 2014, entitled "IMAGE SENSOR APPARATUS AND METHOD FOR SIMULTANEOUSLY CAPTURING FLASH AND AMBIENT ILLUMINATED IMAGES;" or application Ser. No. 14/535,279, filed Nov. 6, 2014, entitled "IMAGE SENSOR APPARATUS AND METHOD FOR OBTAINING LOW-NOISE, HIGH-SPEED CAPTURES OF A PHOTOGRAPHIC SCENE;" which are incorporated herein as though set forth in full.

In some embodiments, a first exposure pixel data 533 may include pixel data for an EV− exposure of a given pixel, a second exposure pixel data 535 may include pixel data for an EV0 exposure of the pixel, and a third exposure pixel data 537 may include pixel data for an EV+ exposure of the pixel. Of course, any of the pixel data 533-537 may include pixel data for any exposure of the pixel. To this end, pixel data for three different exposures of a same pixel are shown provided by the buffer 531 to the HDR pixel generator 541 in FIG. 5.

In other embodiments, an HDR pixel generator 541 may receive a different number of exposures of a given pixel. For example, in one embodiment, the HDR pixel generator 541 may receive pixel data for two exposures of a given pixel. As options, in such an embodiment, the HDR pixel generator 541 may receive data for an EV− exposure and an EV0 exposure of a given pixel, or an EV0 exposure and an EV+ exposure of a given pixel.

After receiving each of the first exposure pixel data 533, the second exposure pixel data 535, and the third exposure pixel data 537, the HDR pixel generator 541 may then perform a blend operation on the three instances of pixel data and output HDR pixel data 545. As noted previously, in one embodiment the blend operation performed to generate the HDR pixel data 545 may be any of the blend operations discussed within U.S. patent application Ser. No. 14/534,068, filed Nov. 5, 2014, entitled "SYSTEMS AND METHODS FOR HIGH-DYNAMIC RANGE IMAGES," the contents of which are hereby incorporated as if set forth in full.

To this end, the HDR pixel generator 541 may be operative to generate HDR pixel data 545 for an HDR pixel utilizing only pixel data from multiple exposures of a given pixel of an image sensor. Thus, the HDR pixel generator 541 does not require pixel data of additional pixels of the image sensor that neighbor the given pixel, and may perform an operation utilizing only two or more exposures of a single pixel. Further, because each of the two or more exposures of a given pixel may be generated in a manner with zero, or near zero, interframe time, the two or more exposures of the pixel may be used to generate the HDR pixel without performing an alignment step. In other words, pixel stream 520 may inherently include pre-aligned pixel data, which may be used by the blending circuitry 501 to generate HDR pixels.

To this end, using relatively low-power resources, a stream of HDR pixels may be rapidly generated and output based on an input stream of pixel data. For example, the stream of HDR pixels may be generated as the stream of pixel data is in transit from an image sensor. Further, the stream of HDR pixels may be generated without use of a graphics processing unit (GPU), which may allow for disabling at least a portion of the GPU, or for use of the GPU to perform other processing tasks. Such processing tasks may include performing dehazing operations or contrast enhancement on the HDR pixel stream.

Still further, in addition to outputting the HDR pixel data 545, the blending circuitry 501 may also output a first received pixel data 543 and a second received pixel data 547. In one embodiment, the first received pixel data 543 may comprise one of the first exposure pixel data 533, the second exposure pixel data 535, and the third exposure pixel data 537. In such an embodiment, the second received pixel data 547 may comprise another one of the first exposure pixel data 533, the second exposure pixel data 535, and the third exposure pixel data 537.

For example, the first received pixel data 543 may comprise the first exposure pixel data 533, and the second received pixel data 547 may comprise the third exposure pixel data 537. As noted previously, the first exposure pixel data 533 may include pixel data for an EV− exposure of a given pixel, and the third exposure pixel data 537 may include pixel data for an EV+ exposure of the given pixel. Thus, in such an example, the first received pixel data 543 may include pixel data for the EV− exposure of the given pixel, and the second received pixel data 547 may include pixel data for the EV+ exposure of the given pixel. To this end, in addition to outputting the HDR pixel data 545, the blending circuitry 501 may also output various instances of the pixel data utilized to generate the HDR pixel data 545. For example, the blending circuitry 501 may output for a pixel each of an EV+ exposure of the pixel, an EV− exposure of the pixel, and an HDR pixel.

Of course, in other embodiments, the blending circuitry 501 may output an EV0 exposure of a pixel as either the first received pixel data 543 or the second received pixel data 547, such that the EV0 exposure of a pixel is output with the HDR pixel for subsequent processing and/or storage. In one embodiment, any output exposures of the pixel may be stored with the HDR pixel in flash storage. In some embodiments, it may be useful to retain one or more exposures of the pixel that were used to generate the HDR pixel. For example, the one or more exposures of the pixel used to generate the HDR pixel may be used in subsequent HDR processing, for generating a non-HDR image, or in any other technically feasible manner.

Still further, after outputting the HDR pixel data 545, which was generated utilizing pixel data for multiple exposures of a first pixel, the blending circuit 501 may output second HDR pixel data for a second HDR pixel. The second HDR pixel data may be generated by the HDR pixel generator 541 utilizing pixel data for multiple exposures of a second pixel. The second pixel may be a neighboring pixel of the first pixel. For example, the second pixel may be adjacent to the first pixel in a row or line of pixels of an image sensor. Still further, after outputting the second HDR pixel data, the blending circuit 501 may output a third HDR pixel. The third HDR pixel may be generated by the HDR pixel generator 541 utilizing pixel data for multiple exposures of a third pixel. The third pixel may be a neighboring pixel of the second pixel. For example, the third pixel may be adjacent to the second pixel in the row or line of pixels of the image sensor. Still further, along with each of the second HDR pixel and the third HDR pixel, the blending circuit 501 may also output received pixel data utilized to generate, respectively, the second HDR pixel and the third HDR pixel.

The blending circuitry 501 may be operative to output a stream of pixel data for HDR pixels of an HDR image, where each of the HDR pixels is generated based on a respective pixel of an image sensor. Further still, with each output HDR pixel, the pixel data from corresponding the two or more exposures of the pixel may also be output. Thus, an HDR pixel may be output with the pixel data utilized to generate the HDR pixel.

Additionally, because the blending circuitry 501 may be operative to continuously process the pixel data of the pixel stream 520 as the pixel stream 520 is received, the pixel stream 520 may be received from an image sensor that is capturing and transmitting pixel data at a rate of multiple frames per second. In such an embodiment, digital pixel data units 521-526 may include pixel data for pixels or lines of a frame of video output by an image sensor. To this end, the blending circuitry 501 may be operative to receive pixels for a frame of video at two or more exposures, and generate HDR pixels for the frame of video utilizing the received pixels. Further, the blending circuitry 501 may be operative to receive pixels for the frame of video at the two or more exposures and generate HDR pixels for the frame as additional digital pixel data is received in the pixel stream 520 for one or more other frames of the video. In one embodiment, one or more pixels of a second frame of video may be buffered by a buffer 531 as a HDR pixel generator 541 outputs HDR pixels for a first frame of the video.

As shown in FIG. 5, the blending circuitry 501 may be a discrete component that exists along one or more electrical interconnects between an image sensor and an application processor 335. In one embodiment, the pixel stream 520 may be received by the blending circuit 501 on a single electrical interconnect. In other embodiments, the pixel stream 520 may be received by the blending circuitry 501 along two or more electrical interconnects. Such an implementation may allow for concurrent receipt of multiple instances of pixel data at the blending circuitry 501. In one embodiment, a first received pixel data 543, a second received pixel data 547, and a HDR pixel data 545 may be output to an application processor 335 along a single electrical interconnect. In other embodiments, a first received pixel data 543, a second received pixel data 547, and a HDR pixel data 545 may be output to an application processor 335 along two or more electrical interconnects. Such an implementation may allow for concurrent receipt of multiple instances of pixel data at the application processor 335.

To this end, the blending circuitry 501 may be operative to receive pixels for a frame of video at two or more exposures, and generate HDR pixels for the frame of video utilizing the received pixels. Further, the blending circuitry 501 may be operative to receive pixels for the frame of video at the two or more exposures and generate HDR pixels for the frame as additional digital pixel data is received in the pixel stream 520 for one or more other frames of the video.

As noted above, blending circuitry 501 may be operative to continuously process pixel data of a pixel stream 520 as the pixel stream 520 is received, such that a stream of HDR pixels is output from the blending circuitry 501. In such an embodiment, first received pixel data 543 may be included in a stream of pixel data associated with a first exposure, and second received pixel data 547 may be included in a stream of pixel data associated with a second exposure. Thus, in one embodiment, in addition to outputting a stream of HDR pixels, the blending circuitry 501 may also output at least one stream of pixel data utilized to generate the HDR pixels. For example, the blending circuitry may output a stream of EV0 pixel data utilized to generate the HDR pixels, a stream of EV− pixel data utilized to generate the HDR pixels, and/or a stream of EV+ pixel data utilized to generate the HDR pixels.

In one embodiment, sets of pixel data may be saved separately. For example, a stream of EV0 pixel data may be used to generate a stream of HDR pixels at the blending circuitry 501, and then the stream of EV0 pixels may stored separately from the stream of HDR pixels. Similarly, a stream of EV− or EV+ pixels may be stored separately from the HDR pixels. To this end, a stored stream of HDR pixels may comprise a HDR video, a stored stream of EV0 pixels may comprise the same video captured at EV0, and a stored stream of EV+ or EV− pixels may comprise the same video captured at EV+ or EV−, respectively.

In another embodiment, an application processor 335 may generate a residue image utilizing two or more received pixel streams. For example, the application processor 335 may receive a stream of HDR pixels from the blending circuitry 501, as well as one or more streams of received pixel data from the blending circuitry 501. Each of the one or more streams of received pixel data may include an EV0, EV+, or EV− pixel stream. The application processor 335 may be operative to perform a compare operation that compares the received stream of HDR pixels with one or more of the EV0, EV+, or EV− pixel stream to generate the residue image. For example, the application processor 335 may compare a given pixel within the HDR pixel stream with the given pixel within the EV0 pixel stream to generate a difference or scaling value, and then store the difference or scaling value. The application processor 335 may generate a plurality of difference values or scaling values for a plurality of corresponding pixels between the HDR pixel stream and the EV0 pixel stream. The plurality of difference values or scaling values may then be stored as a residue image. Of course, comparing any of the EV+, EV0, and EV− pixel streams with the HDR pixel stream may work equally well to generate difference values or scaling values.

Further, one or more generated residue images may then be stored in association with the HDR pixel stream. In such an embodiment, one or more of the EV0, EV−, or EV+ pixel streams may be discarded. Storing residue images in lieu of the one or more discarded EV0, EV−, or EV+ pixel streams may utilize less storage space. For example, a discarded EV− pixel stream may be subsequently reconstructed utilizing an associated HDR pixel stream, an associated EV0 pixel stream, and/or an associated EV+ pixel stream in conjunction with residue images previously generated utilizing the discarded EV− pixel stream. In such an embodiment, storage of the residue images may require substantially less storage capacity than storage of the EV− pixel stream.

In another embodiment, blending circuitry may be included in an application processor 335. In certain embodiments, blending circuitry includes histogram accumulation circuitry for implementing level mapping, such as contrast-limited adaptive histogram equalization (CLAHE). In such embodiments, the accumulation circuitry generates a cumulative distribution function (CDF) operative to perform localized level mapping. To this end, localized contrast enhancement may be implemented, for example by the either the blending circuitry or the application processor 335 based on the CDF.

Figure 6:
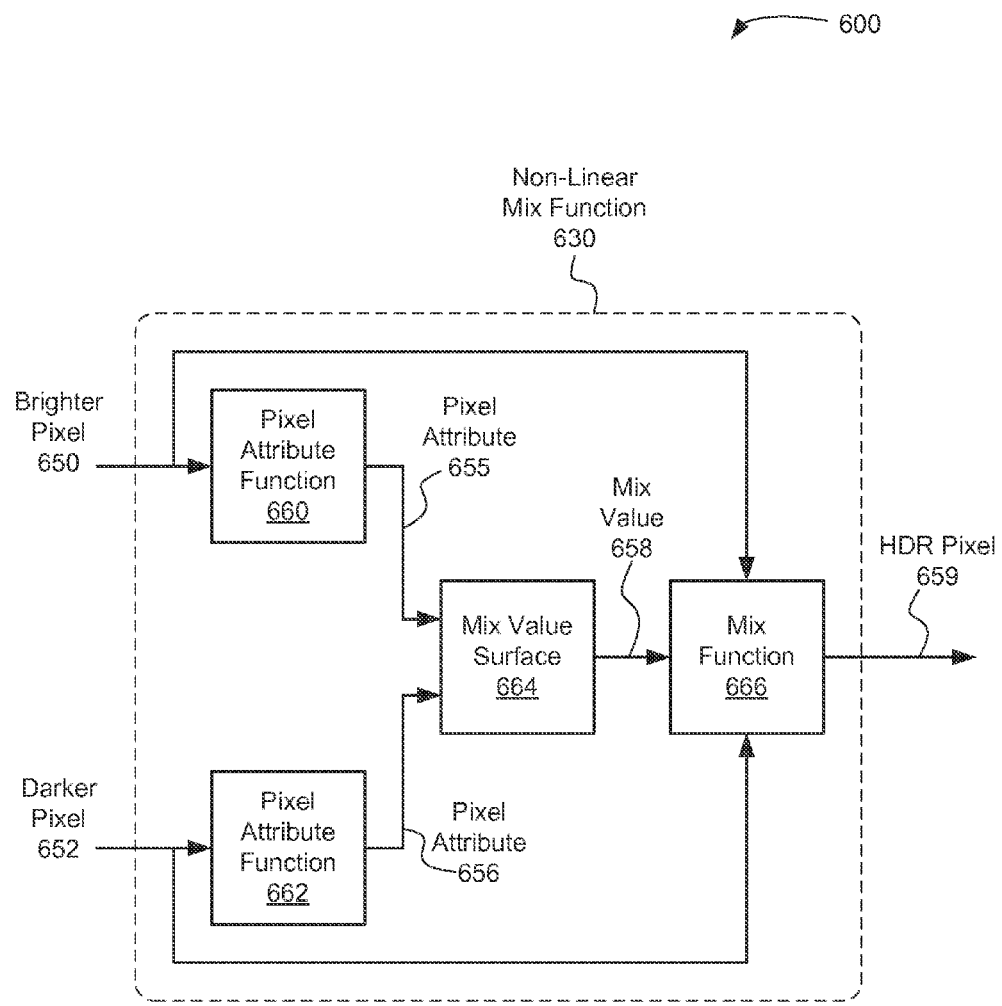
FIG. 6 illustrates a system for generating a HDR pixel, in accordance with another embodiment.

FIG. 6 shows a system 600 for outputting a HDR pixel, in accordance with one embodiment. As an option, the system 600 may be implemented in the context of any of the Figures. Of course, however, the system 600 may be carried out in any desired environment. Further, the aforementioned definitions may equally apply to the description below.

As shown, the system 600 includes a non-linear mix function 630. In one embodiment, the non-linear mix function 630 includes receiving a brighter pixel 650 and a darker pixel 652. In one embodiment, the brighter pixel 650 and the darker pixel 652 may be blended via a mix function 666, resulting in a HDR pixel 659.

In one embodiment, the non-linear mix function 630 may be performed by the blending circuitry 501 of FIG. 5. For example, the non-linear mix function 630 may be performed by an HDR pixel generator 501 of FIG. 5. In one embodiment, the HDR pixel generator 501 may be configured to receive two pixels, identify an attribute of each of the two pixels, select a scalar or mix value based on the attributes of the two pixels, and then perform a mix function on the two pixels using the selected scalar or mix value, where performing the mix function on the two pixels using the selected scalar or mix value generates a HDR pixel. The HDR pixel may then be output in an HDR pixel stream.

As described in the context of FIG. 6, pixel data for one or more exposures from a given pixel may be referred to as a "pixel." For example, pixel data from a first exposure of a pixel may be referred to as a first pixel, pixel data from a second exposure of the pixel may be referred to as a second pixel, and pixel data from a third exposure of the pixel may be referred to as a third pixel. Further, each of the pixel data from the first exposure, the second exposure, and the third exposure may be referred to as a brighter pixel or bright exposure pixel, medium pixel or medium exposure pixel, or darker pixel or dark exposure pixel in comparison to other pixel data sampled from the same pixel of an image sensor. For example, pixel data captured at an EV0 exposure may be referred to as a medium exposure pixel, pixel data captured at an EV− exposure may be referred to as a darker exposure pixel, and pixel data captured at an EV+ exposure may be referred to as a brighter exposure pixel. As an option, an EV0 exposure may be referred to as a brighter pixel or a darker pixel, depending on other exposures of the same pixel. Accordingly, it should be understood that in the context of FIG. 6, any blending or mixing operation of two or more pixels refers to a blending or mixing operation of pixel data obtained from a single pixel of an image sensor sampled at two or more exposures.

In one embodiment, the mix function 666 may include any function which is capable of combining two input values (e.g. pixels, etc.). The mix function 666 may define a linear blend operation for generating a vec3 value associated with HDR pixel 659 by blending a vec3 value associated with the brighter pixel 650 and a vec3 value associated with the darker pixel 652 based on mix value 658. For example the mix function 666 may implement the well-known OpenGL mix function. In other examples, the mix function may include normalizing a weighted sum of values for two different pixels, summing and normalizing vectors (e.g. RGB, etc.) associated with the input pixels, computing a weighted average for the two input pixels, and/or applying any other function which may combine in some manner the brighter pixel and the darker pixel. In one embodiment, mix value 658 may range from 0 to 1, and mix function 666 mixes darker pixel 652 and brighter pixel 650 based on the mix value 658. In another embodiment, the mix value 658 ranges from 0 to an arbitrarily large value, however the mix function 666 is configured to respond to mix values greater than 1 as though such values are equal to 1. Further still, the mix value may be a scalar.

In one embodiment, a mix value function may include a product of two polynomials and may include a strength coefficient. In a specific example, the mix value function is implemented as mix value surface 664, which operates to generate mix value 658. One exemplary mix value function is illustrated below in Equation 1:

$$z = p1(x) * p2(y) * s \quad \text{(Eq. 1)}$$

where:
z is resulting mix value for first and second pixels;
p1 is a first polynomial in x, where x may be a pixel attribute for first (darker) pixel;
p2 is a second polynomial in y, where y may be a pixel attribute for second (lighter) pixel; and
s is a strength coefficient (s=0: no mixing, s=1.0: nominal mixing, s>1.0: exaggerated mixing).

In Equation 1, the strength coefficient(s) may cause the resulting mix value to reflect no mixing (e.g. s=0, etc.), nominal mixing (e.g. s=1, etc.), and exaggerated mixing (e.g. s>1.0, etc.) between the first and second pixels.

In another specific embodiment, a mix function may include a specific polynomial form:

$$z = (1-(1-(1-x)^A)^B) * ((1-(1-y)^C)^D) * s \quad \text{(Eq. 2)}$$

As shown, p1(x) of Equation 1 may be implemented in Equation 2 as the term $(1-(1-(1-x)^A)^B)$, while p2(y) of Equation 2 may be implemented as the term $((1-(1-y)^C)^D)$. In one embodiment, Equation 2 may include the following coefficients: A=8, B=2, C=8, and D=2. Of course, in other embodiments, other coefficient values may be used to optimize overall mixing, which may include subjective visual quality associated with mixing the first and second pixels. In certain embodiments, Equation 2 may be used to mix a combination of an "EV0" pixel (e.g. a pixel from an image having an EV0 exposure), an "EV−" pixel (e.g. a pixel from an image having an exposure of EV−1, EV−2, or EV−3, etc.), and an "EV+" pixel (e.g. a pixel from an image having an exposure of EV+1, EV+2, or EV+3, etc.). Further, in another embodiment, Equation 2 may be used to mix images having a bright exposure, median exposure, and/or dark exposure in any combination.

Figure 10A:
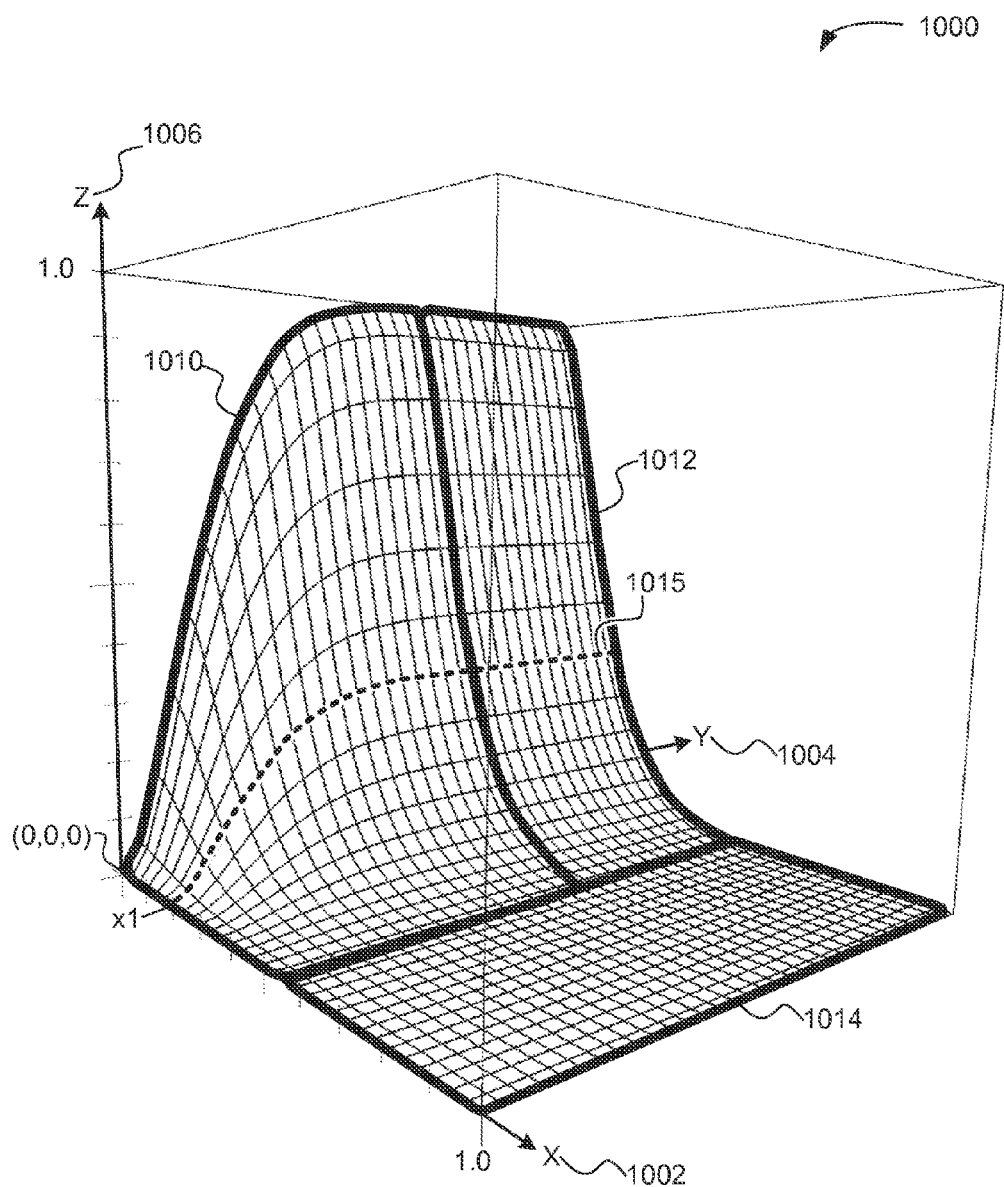
FIG. 10A illustrates a surface diagram, in accordance with another embodiment.
Figure 10B:
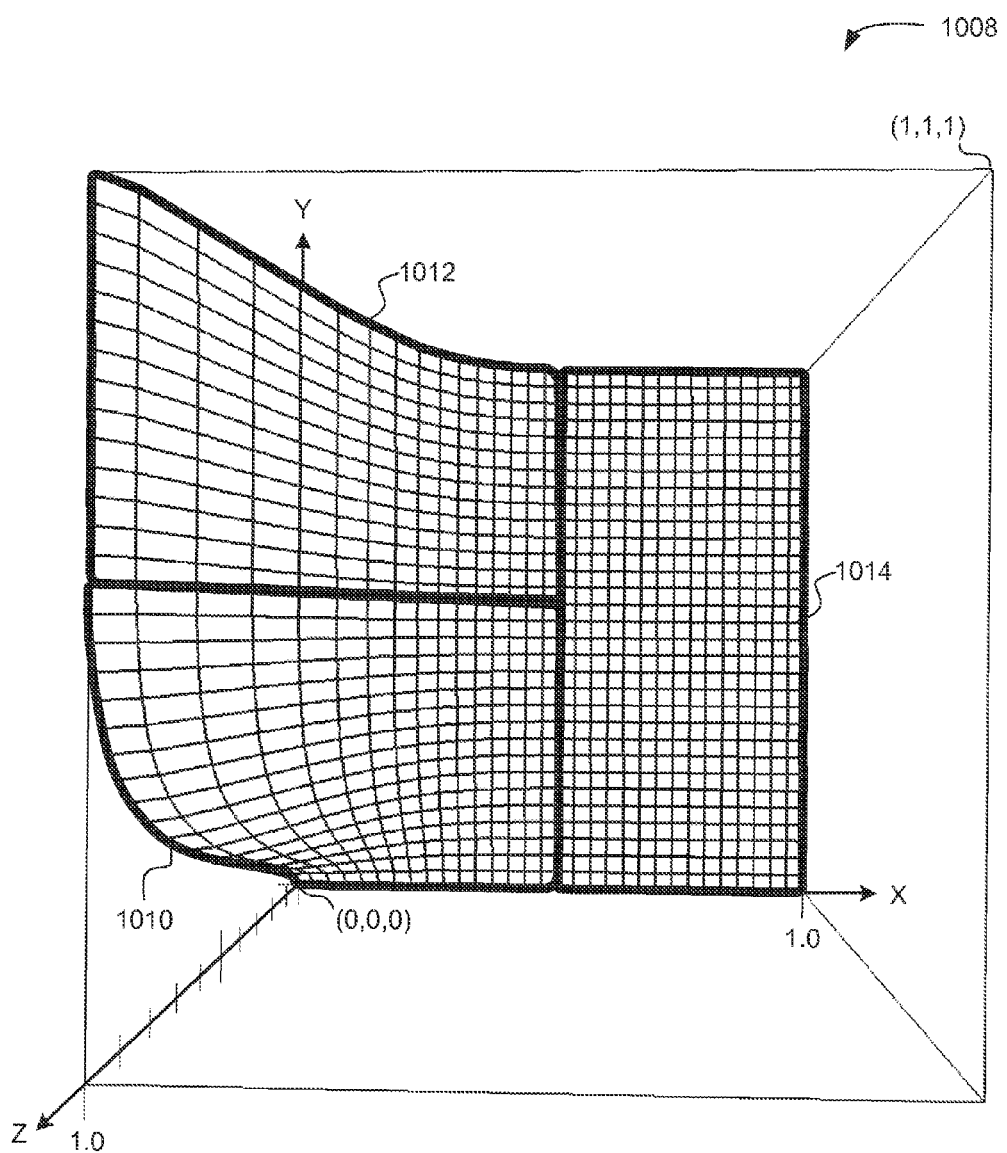
FIG. 10B illustrates a surface diagram, in accordance with another embodiment.

In another embodiment, when z=0, the darker pixel may be given full weight, and when z=1, the brighter pixel may be given full weight. In one embodiment, Equation 2 may correspond with the surface diagrams as shown in FIGS. 10A and 10B.

In another specific embodiment, a mix function may include a specific polynomial form:

$$z = ((1-(1-x)^A)^B) * ((1-(1-y)^C)^D) * s \quad \text{(Eq. 3)}$$

As shown, p1(x) of Equation 1 may be implemented in Equations 3 as the term $((1-(1-x)^A)^B)$, while p2(y) of Equation 3 may be implemented as the term $((1-(1-y)^C)^D)$. In one embodiment. Equation 3 may include the following coefficients: A=8, B=2, C=2, and D=2. Of course, in other embodiments, other coefficient values may be used to optimize the mixing. In another embodiment. Equation 3 may be used to mix an "EV0" pixel, and an "EV−" pixel (e.g., EV−1, EV−2, or EV−3) pixel. Further, in another embodiment, Equation 3 may be used to mix a bright exposure, median exposure, and/or dark exposure in any combination.

Figure 11A:
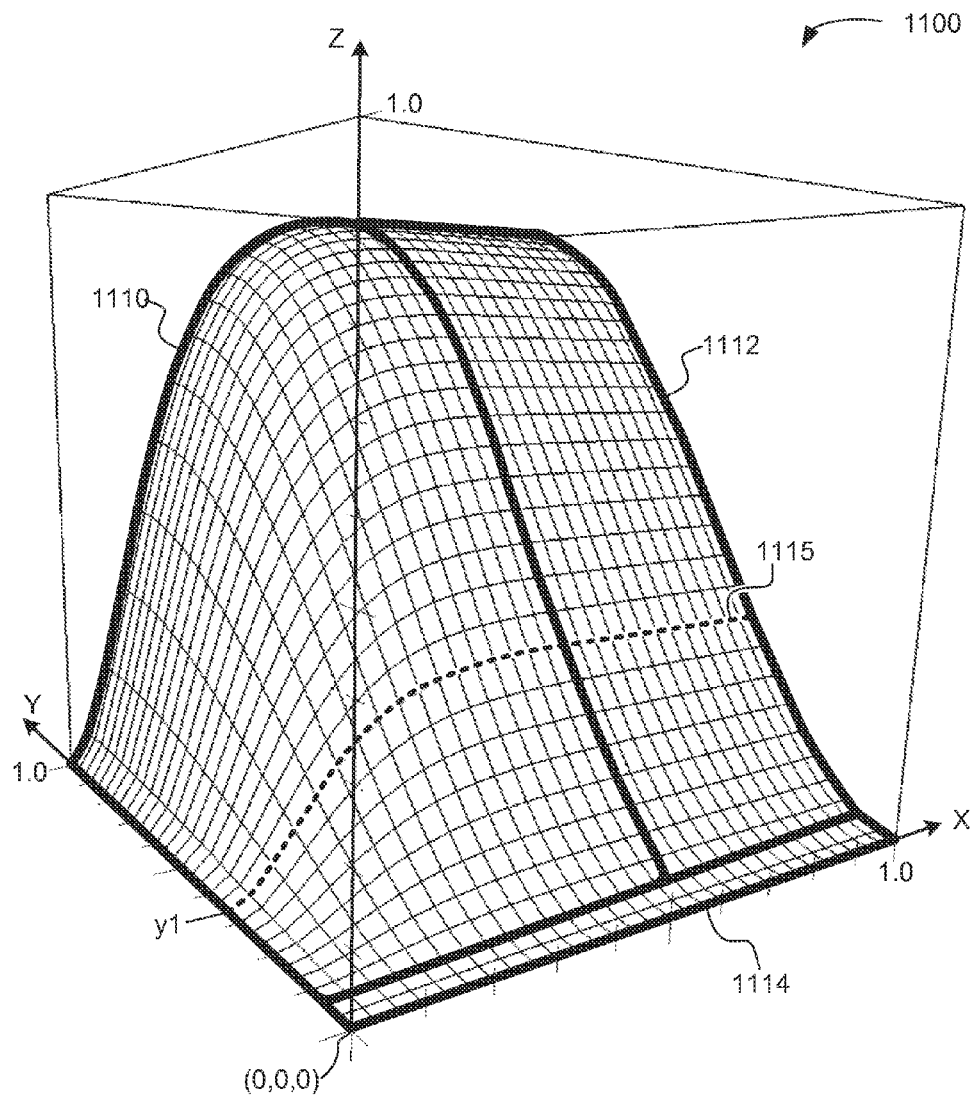
FIG. 11A illustrates a surface diagram, in accordance with another embodiment.
Figure 11B:
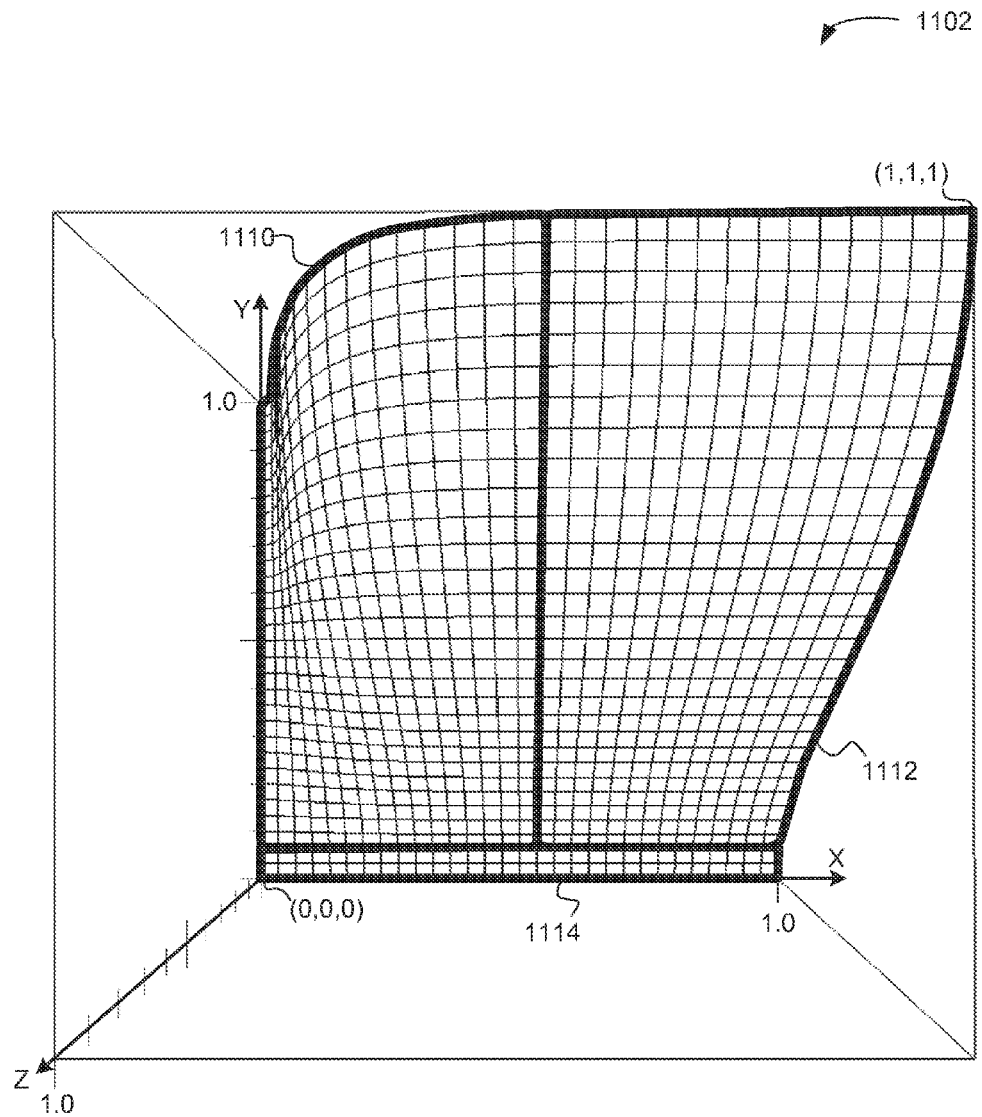
FIG. 11B illustrates a surface diagram, in accordance with another embodiment.

In another embodiment, when z=0, the brighter pixel may be given full weight, and when z=1, the darker pixel may be given full weight. In one embodiment, Equation 3 may correspond with the surface diagrams as shown in FIGS. 11A and 11B.

In another embodiment, the brighter pixel 650 may be received by a pixel attribute function 660, and the darker pixel 652 may be received by a pixel attribute function 662. In various embodiments, the pixel attribute function 660 and/or 662 may include any function which is capable of determining an attribute associated with the input pixel (e.g. brighter pixel, darker pixel, etc.). For example, in various embodiments, the pixel attribute function 660 and/or 662 may include determining an intensity, a saturation, a hue, a color space (e.g. EGB, YCbCr, YUV, etc.), a RGB blend, a brightness, an RGB color, a luminance, a chrominance, and/or any other feature which may be associated with a pixel in some manner.

In response to the pixel attribute function 660, a pixel attribute 655 associated with brighter pixel 650 results and is inputted into a mix value function, such as mix value surface 664. Additionally, in response to the pixel attribute function 662, a pixel attribute 656 associated with darker pixel 652 results and is inputted into the mix value function.

In one embodiment, a given mix value function may be associated with a surface diagram. For example, in one embodiment, an x value may be associated with a polynomial associated with the first pixel attribute (or a plurality of pixel attributes), and a y value may be associated with a polynomial associated with the second pixel attribute (or a plurality of pixel attributes). Further, in another embodiment, a strength function may be used to scale the mix value calculated by the mix value function. In one embodiment, the mix value may include a scalar.

In one embodiment, the mix value 658 determined by the mix value function may be selected from a table that embodies the surface diagram. In another embodiment, a first value associated with a first polynomial and a second value associated with a second polynomial may each be used to select a corresponding value from a table, and the two or more values may be used to interpolate a mix value. In other words, at least a portion of the mix value function may be implemented as a table (e.g. lookup table) indexed in x and y to determine a value of z. Each value of z may be directly represented in the table or interpolated from sample points comprising the table. Accordingly, a scalar may be identified by at least one of generating, selecting, and interpolating.

As shown, a mix value 658 results from the mix value surface 664 and is inputted into the mix function 666, described previously.

HDR Pixel 659 may be generated based on the brighter pixel 650 and the darker pixel 652, in accordance with various embodiments described herein.

Figure 7A:
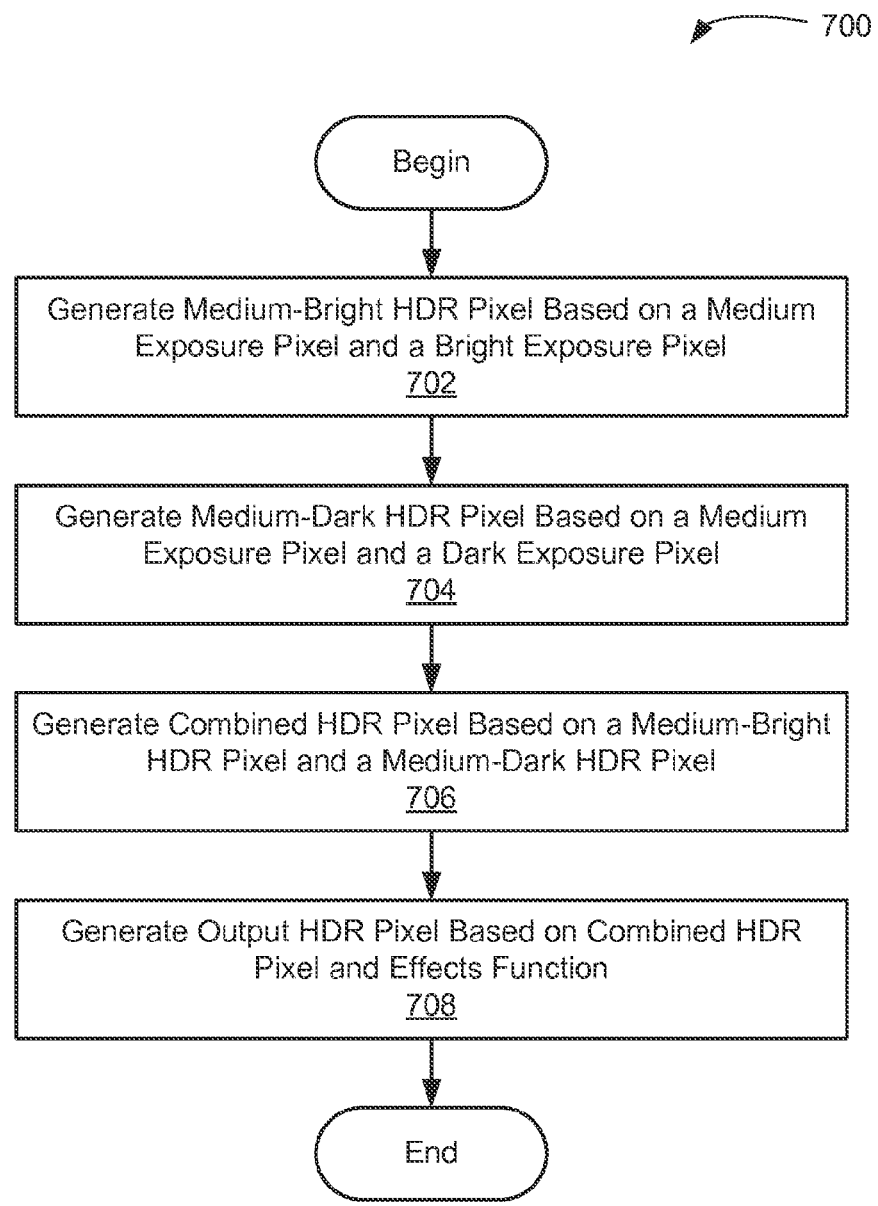
FIG. 7A illustrates a method for generating a HDR pixel, in accordance with another embodiment.

FIG. 7A illustrates a method 700 for generating a HDR pixel based on combined HDR pixel and effects function, in accordance with another embodiment. As an option, the method 700 may be carried out in the context of the details of any of the Figures. Of course, however, the method 700 may be carried out in any desired environment. Further, the aforementioned definitions may equally apply to the description below.

Figure 7B:
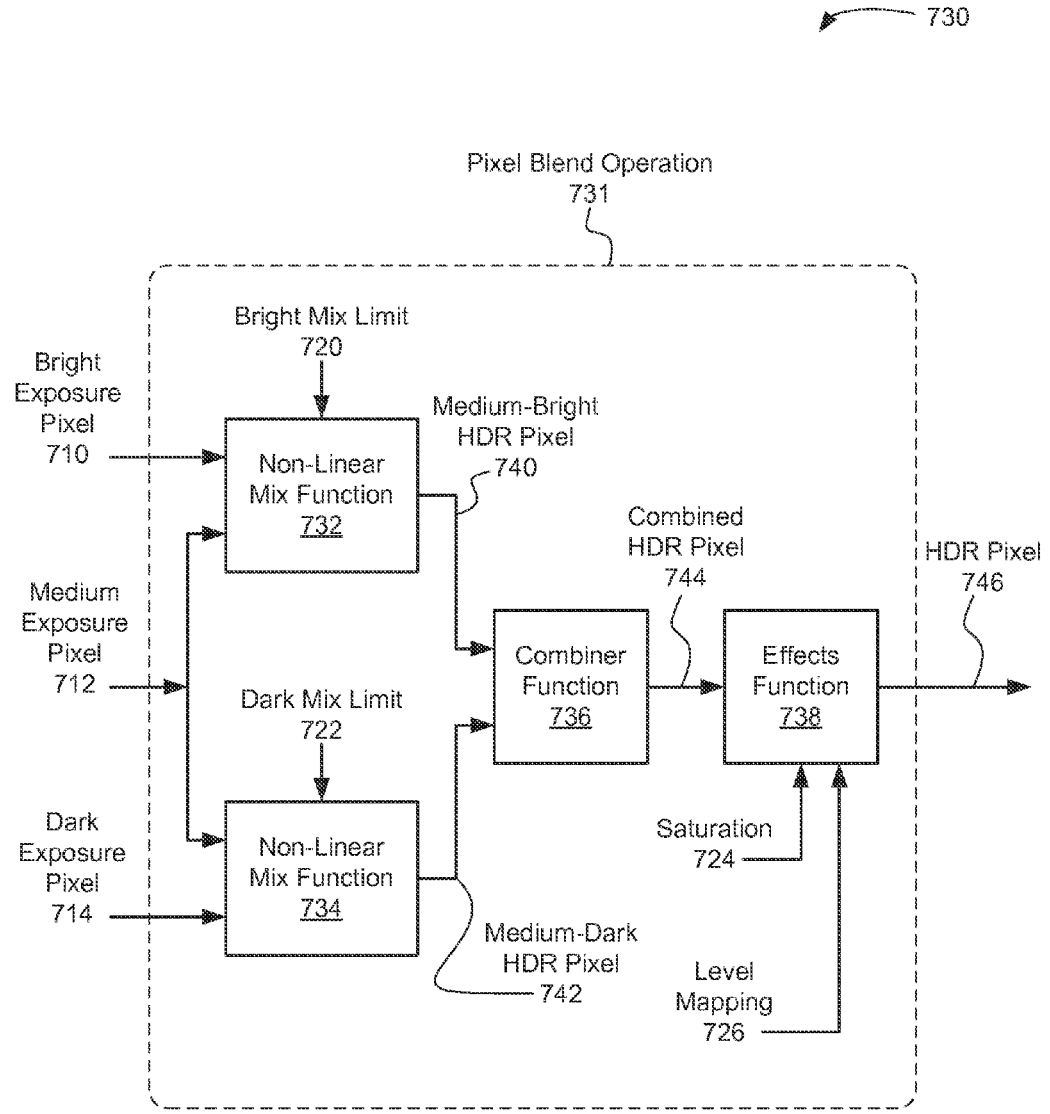
FIG. 7B illustrates a system for generating a HDR pixel, in accordance with another embodiment.

As described in the context of FIGS. 7A-7B, pixel data for one or more exposures from a given pixel may be referred to as a "pixel." For example, pixel data from a first exposure of a pixel may be referred to as a first pixel, pixel data from a second exposure of the pixel may be referred to as a second pixel, and pixel data from a third exposure of the pixel may be referred to as a third pixel. Further, each of the pixel data from the first exposure, the second exposure, and the third exposure may be referred to as a brighter pixel or bright exposure pixel, medium pixel or medium exposure pixel, or darker pixel or dark exposure pixel in comparison to other pixel data sampled from the same pixel of an image sensor. For example, pixel data captured at an EV0 exposure may be referred to as a medium exposure pixel, pixel data captured at an EV− exposure may be referred to as a darker exposure pixel, and pixel data captured at an EV+ exposure may be referred to as a brighter exposure pixel. As an option, an EV0 exposure may be referred to as a brighter pixel or a darker pixel, depending on other exposures of the same pixel. Accordingly, it should be understood that in the context of FIGS. 7A-7B, any blending or mixing operation of two or more pixels refers to a blending or mixing operation of pixel data obtained from a single pixel of an image sensor sampled at two or more exposures.

As shown, in one embodiment, a medium-bright HDR pixel may be generated based on a medium exposure pixel and a bright exposure pixel. See operation 702. Additionally, a medium-dark HDR pixel may be generated based on a medium exposure pixel and a dark exposure pixel. See operation 704. For example, in one embodiment, a medium exposure pixel may include an EV0 exposure and a bright exposure pixel may include an EV+1 exposure, and medium-bright HDR pixel may be a blend between the EV0 exposure pixel and the EV+1 exposure pixel. Of course, a bright exposure pixel may include an exposure greater (e.g. in any amount, etc.) than the medium exposure value.

In another embodiment, a medium exposure pixel may include an EV0 exposure and a dark exposure pixel may include an EV−1 exposure, and a medium-dark HDR pixel may be a blend between the EV0 exposure and the EV−1 exposure. Of course, a dark exposure pixel may include an exposure (e.g. in any amount, etc.) less than the medium exposure value.

As shown, a combined HDR pixel may be generated based on a medium-bright HDR pixel and a medium-dark HDR pixel. See operation 706. In another embodiment, the combined HDR pixel may be generated based on multiple medium-bright HDR pixels and multiple medium-dark HDR pixels.

In a separate embodiment, a second combined HDR pixel may be based on the combined HDR pixel and a medium-bright HDR pixel, or may be based on the combined HDR pixel and a medium-dark HDR pixel. In a further embodiment, a third combined HDR pixel may be based on a first combined HDR pixel, a second combined HDR pixel, a medium-bright HDR pixel, a medium-dark HDR pixel, and/or any combination thereof.

Further, as shown, an output HDR pixel may be generated based on a combined HDR pixel and an effects function. See operation 708. For example in one embodiment, an effect function may include a function to alter an intensity, a saturation, a hue, a color space (e.g. EGB, YCbCr, YUV, etc.), a RGB blend, a brightness, an RGB color, a luminance, a chrominance, a contrast, an attribute levels function, and/or an attribute curves function. Further, an effect function may include a filter, such as but not limited to, a pastel look, a watercolor function, a charcoal look, a graphic pen look, an outline of detected edges, a change of grain or of noise, a change of texture, and/or any other modification which may alter the output HDR pixel in some manner.

FIG. 7B illustrates a system 730 for outputting a HDR pixel stream, in accordance with another embodiment. As an option, the system 730 may be implemented in the context of the details of any of the Figures. Of course, however, the system 730 may be carried out in any desired environment. Further, the aforementioned definitions may equally apply to the description below.

In one embodiment, the system 730 may include a pixel blend operation 731. In one embodiment, the pixel blend operation 731 may include receiving a bright exposure pixel 710 and a medium exposure pixel 712 at a non-linear mix function 732. In another embodiment, the non-linear mix function 732 may operate in a manner consistent with non-linear mix function 630 of FIG. 6. In another embodiment, the pixel blend operation 731 may include receiving a dark exposure pixel 714 and a medium exposure pixel 712 at a non-linear mix function 734. In another embodiment, the non-linear mix function 734 may operate in a manner consistent with item 630 of FIG. 6.

In one embodiment, the pixel blend operation 731 may be performed by the blending circuitry 501 of FIG. 5. For example, the pixel blend operation 731 may be performed by an HDR pixel generator 501 of FIG. 5. In one embodiment, the HDR pixel generator 501 may be configured to receive three pixels, identify an attribute of each of the three pixels, select mix values based on the attributes of the three pixels, perform mix functions using the selected mix values to obtain two resulting pixels, and then combine the resulting pixels to generate an HDR pixel. The HDR pixel may then be output in an HDR pixel stream.

In various embodiments, the non-linear mix function 732 and/or 734 may receive an input from a bright mix limit 720 or dark mix limit 722, respectively. In one embodiment, the bright mix limit 720 and/or the dark mix limit 722 may include an automatic or manual setting. For example, in some embodiments, the mix limit may be set by predefined settings (e.g. optimized settings, etc.). In one embodiment, each mix limit may be predefined to optimize the mix function. In another embodiment, the manual settings may include receiving a user input. For example, in one embodiment, the user input may correspond with a slider setting on a sliding user interface. Each mix limit may correspond to a respective strength coefficient, described above in conjunction with Equations 1-3.

For example, in one embodiment, a mix value function may include a product of two polynomials and may include a strength coefficient. In a specific example, the mix value function is implemented as mix value surface 664, which operates to generate mix value 658.

One exemplary mix value function is illustrated below in Equation 1:

$$z = p1(x) * p2(y) * s \quad \text{(Eq. 1)}$$

where:
- z is resulting mix value for first and second pixels;
- p1 is a first polynomial in x, where x may be a pixel attribute for first (darker) pixel;
- p2 is a second polynomial in y, where y may be a pixel attribute for second (lighter) pixel; and
- s is a strength coefficient (s=0: no mixing, s=1.0: nominal mixing, s>1.0: exaggerated mixing).

In Equation 1, the strength coefficient (s) may cause the resulting mix value to reflect no mixing (e.g. s=0, etc.), nominal mixing (e.g. s=1, etc.), and exaggerated mixing (e.g. s>1.0, etc.) between the first and second pixels.

In another specific embodiment, a mix function may include a specific polynomial form:

$$z = (1-(1-(1-x)^A)^B) * ((1-(1-y)^C)^D) * s \quad \text{(Eq. 2)}$$

As shown, p1(x) of Equation 1 may be implemented in Equation 2 as the term $(1-(1-(1-x)^A)^B)$, while p2(y) of Equation 2 may be implemented as the term $((1-(1-y)^C)^D)$. In one embodiment, Equation 2 may include the following coefficients: A=8, B=2, C=8, and D=2. Of course, in other embodiments, other coefficient values may be used to optimize overall mixing, which may include subjective visual quality associated with mixing the first and second pixels. In certain embodiments, Equation 2 may be used to mix a combination of an "EV0" pixel (e.g. a pixel from an image having an EV0 exposure), an "EV−" pixel (e.g. a pixel from an image having an exposure of EV−1, EV−2, or EV−3, etc.), and an "EV+" pixel (e.g. a pixel from an image having an exposure of EV+1, EV+2, or EV+3, etc.). Further, in another embodiment, Equation 2 may be used to mix images having a bright exposure, median exposure, and/or dark exposure in any combination.

In another embodiment, when z=0, the darker pixel may be given full weight, and when z=1, the brighter pixel may be given full weight. In one embodiment, Equation 2 may correspond with the surface diagrams as shown in FIGS. 10A and 10B.

In another specific embodiment, a mix function may include a specific polynomial form:

$$z = ((1-(1-x)^A)^B) * ((1-(1-y)^C)^D) * s \quad \text{(Eq. 3)}$$

As shown, p1(x) of Equation 1 may be implemented in Equation 3 as the term $((1-(1-x)^A)^B)$, while p2(y) of Equation 3 may be implemented as the term $((1-(1-y)^C)^D)$. In one embodiment, Equation 3 may include the following coefficients: A=8, B=2, C=2, and D=2. Of course, in other embodiments, other coefficient values may be used to optimize the mixing. In another embodiment, Equation 3 may be used to mix an "EV0" pixel, and an "EV−" pixel (e.g., EV−1, EV−2, or EV−3) pixel. Further, in another embodiment, Equation 3 may be used to mix a bright exposure, median exposure, and/or dark exposure in any combination.

In another embodiment, when z=0, the brighter pixel may be given full weight, and when z=1, the darker pixel may be given full weight. In one embodiment, Equation 3 may correspond with the surface diagrams as shown in FIGS. 11A and 11B.

As shown, in one embodiment, the non-linear mix function 732 results in a medium-bright HDR pixel 740. In another embodiment, the non-linear mix function 734 results in a medium-dark HDR pixel 742. In one embodiment, the medium-bright HDR pixel 740 and the medium-dark HDR pixel 742 are inputted into a combiner function 736. In another embodiment, the combiner function 736 blends the medium-bright HDR pixel 740 and the medium-dark HDR pixel 742.

In various embodiments, the combiner function 736 may include taking an average of two or more pixel values, summing and normalizing a color attribute associated with each pixel value (e.g. a summation of a red/green/blue component in a RGB color space, etc.), determining a RGB (or any color space) vector length which may then be normalized, using an average pixel value in combination with a brighter pixel or a darker pixel, and/or using any other combination to blend the medium-bright HDR pixel 740 and the medium-dark HDR pixel 742.

In one embodiment, the combiner function 736 results in a combined HDR pixel 744. In various embodiments, the combined HDR pixel 744 may include any type of blend associated with the medium-bright pixel 740 and the medium-dark HDR pixel 742. For example, in some embodiments, the combined HDR pixel may include a resulting pixel with no HDR effect applied, whereas in other embodiments, any amount of HDR or even amplification may be applied and be reflected in the resulting combined HDR pixel.

In various embodiments, the combined HDR pixel 744 is inputted into an effects function 738. In one embodiment, the effects function 738 may receive a saturation parameter 724, level mapping parameters 726, and/or any other function parameter which may cause the effects function 738 to modify the combined HDR pixel 744 in some manner. Of course, in other embodiments, the effects function 738 may include a function to alter an intensity, a hue, a color space (e.g. EGB, YCbCr, YUV, etc.), a RGB blend, a brightness, an RGB color, a luminance, a chrominance, a contrast, and/or a curves function. Further, an effect function may include a filter, such as but not limited to, a pastel look, a watercolor function, a charcoal look, a graphic pen look, an outline of detected edges, a change of grain or of noise, a change of texture, and/or any other modification which may alter the combined HDR pixel 744 in some manner. In some embodiments, output HDR pixel 746 may be generated by effects function 738. Alternatively, effects function 738 may be configured to have no effect and output HDR pixel 746 is equivalent to combined HDR pixel 744.

In some embodiments, and in the alternative, the combined HDR pixel 744 may have no effects applied. After passing through an effects function 738, an output HDR pixel 746 results.

Figure 8:
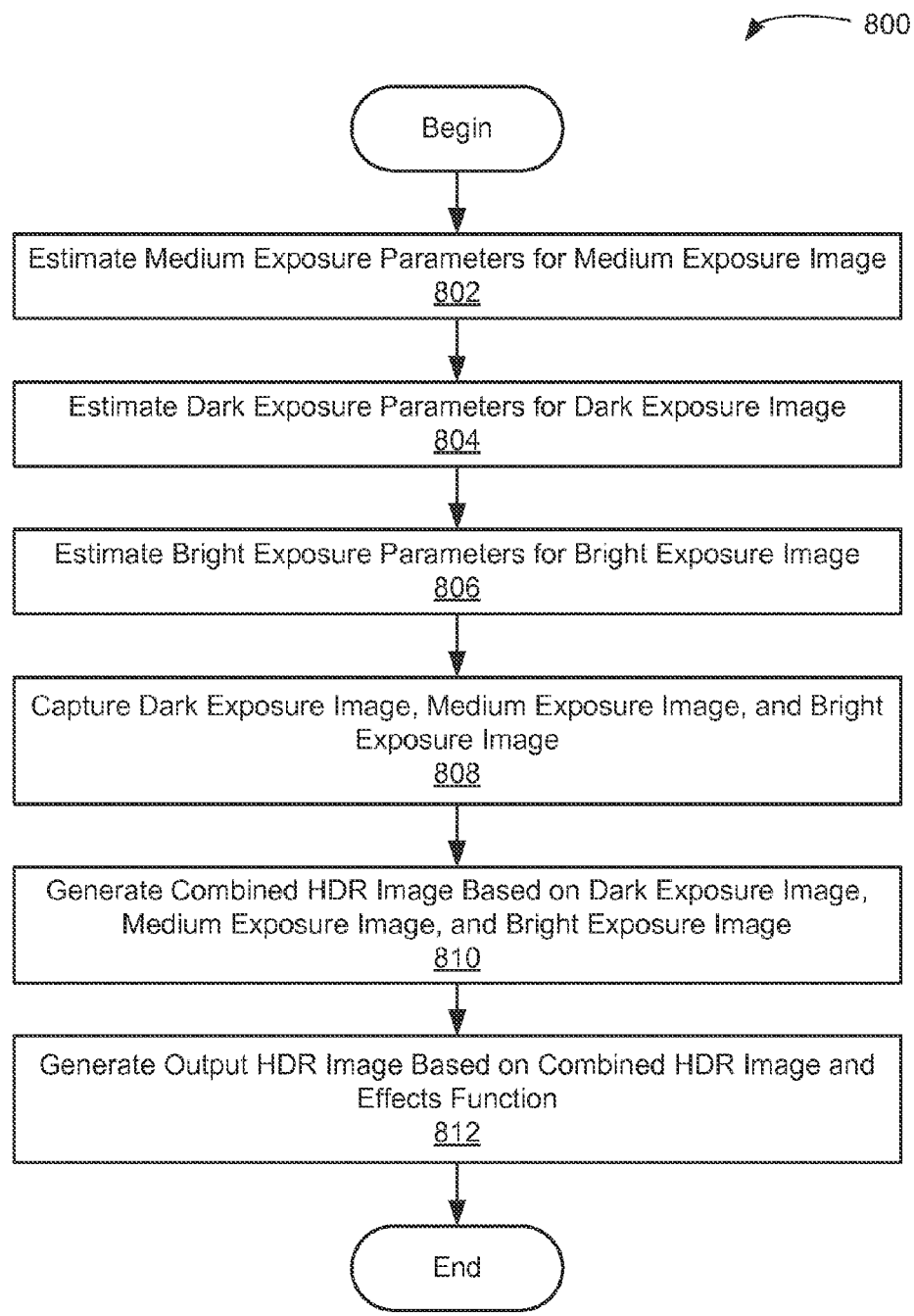
FIG. 8 illustrates a method for generating a HDR pixel, in accordance with another embodiment.

FIG. 8 illustrates a method 800 for generating a HDR pixel based on a combined HDR pixel and an effects function, in accordance with another embodiment. As an option, the method 800 may be carried out in the context of the details of any of the Figures. Of course, however, the method 800 may be carried out in any desired environment. Further, the aforementioned definitions may equally apply to the description below.

In one embodiment, a medium exposure parameter may be estimated for a medium exposure image. See operation 802. Additionally, a dark exposure parameter is estimated for a dark exposure image (see operation 804) and a bright exposure parameter is estimated for a bright exposure image (see operation 806).

In various embodiments, an exposure parameter (e.g. associated with medium exposure, dark exposure, or bright exposure, etc.) may include an ISO, an exposure time, an exposure value, an aperture, and/or any other parameter which may affect image capture time. In one embodiment, the capture time may include the amount of time that the image sensor is exposed to optical information presented by a corresponding camera lens.

In one embodiment, estimating a medium exposure parameter, a dark exposure parameter, and/or a bright exposure parameter may include metering an image associated with a photographic scene. For example, in various embodiments, the brightness of light within a lens' field of view may be determined. Further, the metering of the image may include a spot metering (e.g. narrow area of coverage, etc.), an average metering (e.g. metering across the entire photo, etc.), a multi-pattern metering (e.g. matrix metering, segmented metering, etc.), and/or any other type of metering system. The metering of the image may be performed at any resolution, including a lower resolution than available from the image sensor, which may result in faster metering latency.

As shown, a dark exposure image, a medium exposure image, and a bright exposure image are captured. See operation 808. In various embodiments, capturing an image (e.g. a dark exposure image, a medium exposure image, a bright exposure image, etc.) may include committing the image (e.g. as seen through the corresponding camera lens, etc.) to an image processor and/or otherwise store the image temporarily in some manner. Of course, in other embodiments, the capturing may include a photodiode which may detect light (e.g. RGB light, etc.), a bias voltage or capacitor (e.g. to store intensity of the light, etc.), and/or any other circuitry necessary to receive the light intensity and store it. In other embodiments, the photodiode may charge or discharge a capacitor at a rate that is proportional to the incident light intensity (e.g. associated with the exposure time, etc.).

Additionally, in one embodiment, a combined HDR image may be generated based on a dark exposure image, a medium exposure image, and a bright exposure image. See operation 810. In various embodiments, the combined HDR image may be generated in a manner consistent with combined HDR pixel 744 in FIG. 7B. Further, in one embodiment, an output HDR image may be generated based on a combined HDR image comprising combined HDR pixel 744 and an effects function. See operation 812. In various embodiments, the output HDR image may be generated in a manner consistent with Output HDR Pixel 746 in FIG. 7B.

Figure 9:
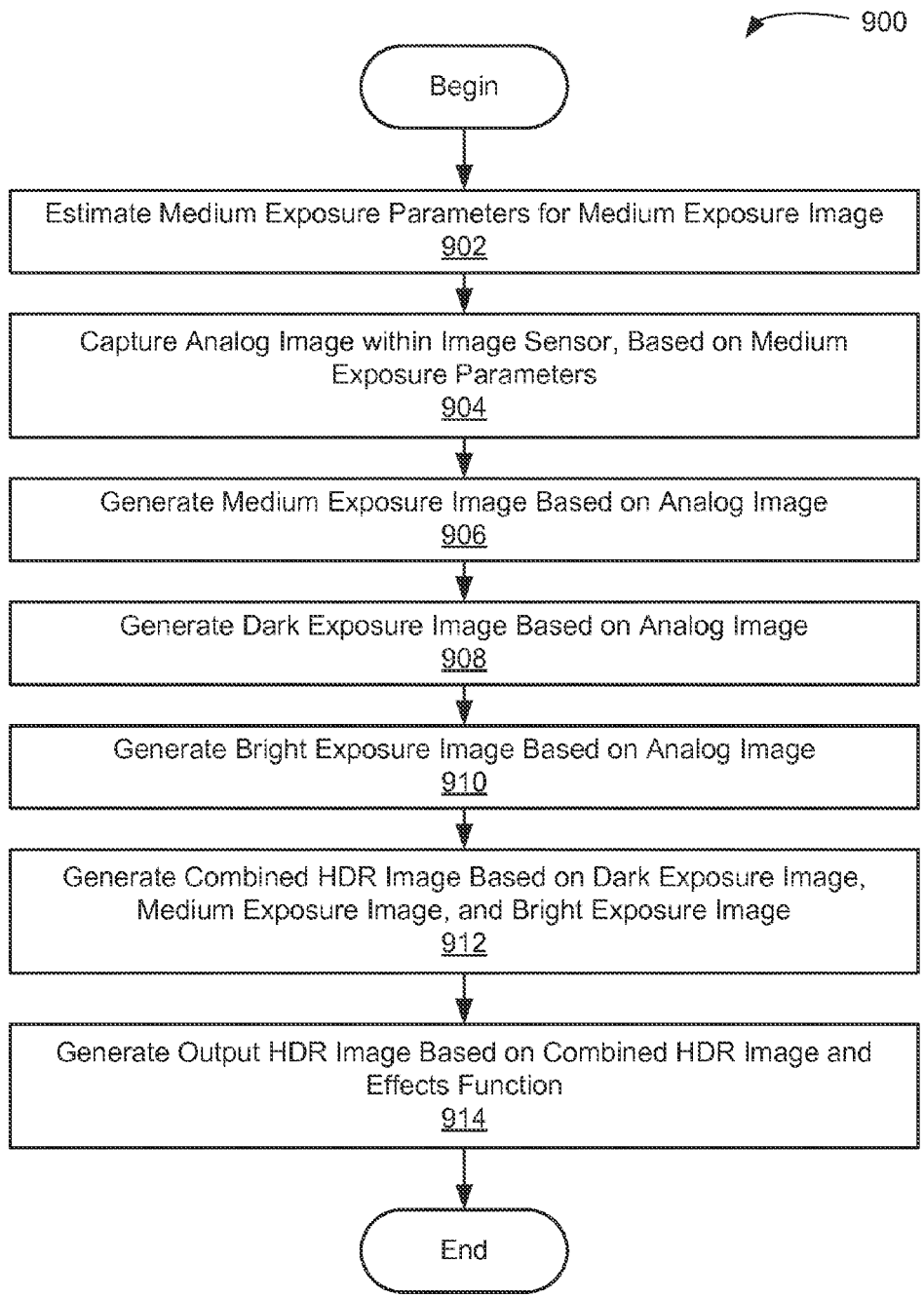
FIG. 9 illustrates a method for generating a HDR pixel, in accordance with another embodiment.

FIG. 9 illustrates a method 900 for generating a HDR pixel based on combined HDR pixel and an effects function, in accordance with another embodiment. As an option, the method 900 may be carried out in the context of the details of any of the Figures. Of course, however, the method 900 may be carried out in any desired environment. Further, the aforementioned definitions may equally apply to the description below.

In one embodiment, a medium exposure parameter may be estimated for medium exposure image. See operation 902. In various embodiments, the medium exposure parameter may include an ISO, an exposure time, an exposure value, an aperture, and/or any other parameter which may affect the capture time. In one embodiment, the capture time may include the amount of time that the image sensor is exposed to optical information presented by a corresponding camera lens. In one embodiment, estimating a medium exposure parameter may include metering the image. For example, in various embodiments, the brightness of light within a lens' field of view may be determined. Further, the metering of the image may include a spot metering (e.g. narrow area of coverage, etc.), an average metering (e.g. metering across the entire photo, etc.), a multi-pattern metering (e.g. matrix metering, segmented metering, etc.), and/or any other type of metering system. The metering of the image may be performed at any resolution, including a lower resolution than available from the image sensor, which may result in faster metering latency. Additionally, in one embodiment, the metering for a medium exposure image may include an image at EV0. Of course, however, in other embodiments, the metering may include an image at any shutter stop and/or exposure value.

As shown, in one embodiment, an analog image may be captured within an image sensor based on medium exposure parameters. See operation 904. In various embodiments, capturing the analog image may include committing the image (e.g. as seen through the corresponding camera lens, etc.) to an image sensor and/or otherwise store the image temporarily in some manner. Of course, in other embodiments, the capturing may include a photodiode which may detect light (e.g. RGB light, etc.), a bias voltage or capacitor (e.g. to store intensity of the light, etc.), and/or any other circuitry necessary to receive the light intensity and store it. In other embodiments, the photodiode may charge or discharge a capacitor at a rate that is proportional to the incident light intensity (e.g. associated with the exposure time, etc.).

Additionally, in one embodiment, a medium exposure image may be generated based on an analog image. See operation 906. Additionally, a dark exposure image may be generated based on an analog image (see operation 908), and a brighter exposure image may be generated based on an analog image (see operation 910). In various embodiments, generating an exposure image (e.g. medium, dark, bright, etc.) may include applying an ISO or film speed to the analog image. Of course, in another embodiment, any function which may alter the analog image's sensitivity to light may be applied. In one embodiment, the same analog image may be sampled repeatedly to generate multiple images (e.g. medium exposure image, dark exposure image, bright exposure image, etc.). For example, in one embodiment, current stored within the circuitry may be read multiple times.

Additionally, in one embodiment, a combined HDR image may be generated based on a dark exposure image, a medium exposure image, and a bright exposure image. See operation 912. In various embodiments, the combined HDR image may be generated in a manner consistent with Combined HDR Pixel 744 in FIG. 7B. Further, in one embodiment, an output HDR image may be generated based on a combined HDR image and an effects function. See operation 914. In various embodiments, the output HDR image may be generated in a manner consistent with Output HDR Pixel 746 in FIG. 7B.

FIG. 10A illustrates a surface diagram 1000, in accordance with another embodiment. As an option, the surface diagram 1000 may be implemented in the context of the details of any of the Figures. Of course, however, the surface diagram 1000 may be implemented in any desired environment. Further, the aforementioned definitions may equally apply to the description below.

As described in the context of FIGS. 10A-10B, pixel data for one or more exposures from a given pixel may be referred to as a "pixel." For example, pixel data from a first exposure of a pixel may be referred to as a first pixel, pixel data from a second exposure of the pixel may be referred to as a second pixel, and pixel data from a third exposure of the pixel may be referred to as a third pixel. Further, each of the pixel data from the first exposure, the second exposure, and the third exposure may be referred to as a brighter pixel or bright exposure pixel, medium pixel or medium exposure pixel, or darker pixel or dark exposure pixel in comparison to other pixel data sampled from the same pixel of an image sensor. For example, pixel data captured at an EV0 exposure may be referred to as a medium exposure pixel, pixel data captured at an EV− exposure may be referred to as a darker exposure pixel, and pixel data captured at an EV+ exposure may be referred to as a brighter exposure pixel. As an option, an EV0 exposure may be referred to as a brighter pixel or a darker pixel, depending on other exposures of the same pixel. Accordingly, it should be understood that in the context of FIG. 10A-10B, any blending or mixing operation of two or more pixels refers to a blending or mixing operation of pixel data obtained from a single pixel of an image sensor sampled at two or more exposures.

In one embodiment, surface diagram 1000 depicts a surface associated with Equation 2 for determining a mix value for two pixels, based on two pixel attributes for the two pixels. As shown, the surface diagram 1000 is illustrated within a unit cube having an x axis 1002, a y axis 1004, and a z axis 1006. As described in Equation 2, variable "x" is associated with an attribute for a first (e.g. darker) pixel, and variable "y" is associated with an attribute for a second (e.g. lighter) pixel. For example, each attribute may represent an intensity value ranging from 0 to 1 along a respective x and y axis of the unit cube. An attribute for the first pixel may correspond to pixel attribute 656 of FIG. 6, while an attribute for the second pixel may correspond to pixel attribute 655. As described in Equation 2, variable "z" is associated with the mix value, such as mix value 658, for generating a HDR pixel, such as HDR pixel 659, from the two pixels. A mix value of 0 (e.g. z=0) may result in a HDR pixel that is substantially identical to the first pixel, while a mix value of 1 (e.g. z=1) may result in a HDR pixel that is substantially identical to the second pixel.

As shown, surface diagram 1000 includes a flat region 1014, a transition region 1010, and a saturation region 1012. The transition region 1010 is associated with x values below an x threshold and y values below a y threshold. The transition region 1010 is generally characterized as having monotonically increasing z values for corresponding monotonically increasing x and y values. The flat region 1014 is associated with x values above the x threshold. The flat region 1014 is characterized as having substantially constant z values independent of corresponding x and y values. The saturation region 1012 is associated with x values below the x threshold and above the y threshold. The saturation region 1012 is characterized as having z values that are a function of corresponding x values while being relatively independent of y values. For example, with x=x1, line 1015 shows z monotonically increasing through the transition region 1010, and further shows z remaining substantially constant within the saturation region 1012. In one embodiment mix value surface 664 implements surface diagram 1000. In another embodiment, non-linear mix function 732 of FIG. 7B implements surface diagram 1000. In yet another embodiment, non-linear mix function 734 of FIG. 7B implements surface diagram 1000.

FIG. 10B illustrates a surface diagram 1008, in accordance with another embodiment. As an option, the surface diagram 1008 may be implemented in the context of the details of any of the Figures. Of course, however, the surface diagram 1008 may be implemented in any desired environment. Further, the aforementioned definitions may equally apply to the description below.

In one embodiment, the surface diagram 1008 provides a separate view (e.g. top down view, etc.) of surface diagram 1000 of FIG. 10A. Additionally, the description relating to FIG. 10A may be applied to FIG. 10B as well.

FIG. 11A illustrates a surface diagram 1100, in accordance with another embodiment. As an option, the surface diagram 1100 may be implemented in the context of the details of any of the Figures. Of course, however, the surface diagram 1100 may be implemented in any desired environment. Further, the aforementioned definitions may equally apply to the description below.

In one embodiment, surface diagram 1100 depicts a surface associated with Equation 3 for determining a mix value for two pixels, based on two pixel attributes for the two pixels. As described in Equation 3, variable "x" is associated with an attribute for a first (e.g. darker) pixel, and variable "y" is associated with an attribute for a second (e.g. lighter) pixel. The flat region 1114 may correspond in general character to flat region 1014 of FIG. 10A. Transition region 1110 may correspond in general character to transition region 1010. Saturation region 1112 may correspond in general character to saturation region 1012. While each region of surface diagram 1100 may correspond in general character to similar regions for surface diagram 1000, the size of corresponding regions may vary between surface diagram 1100 and surface diagram 1000. For example, the x threshold associated with surface diagram 1100 is larger than the x threshold associated with surface diagram 1000, leading to a generally smaller flat region 1114. As shown, the surface diagram 1100 may include a flat region 1114, a transition region 1110, and a saturation region 1112.

FIG. 11B illustrates a surface diagram 1102, in accordance with another embodiment. As an option, the surface diagram 1102 may be implemented in the context of the details of any of the Figures. Of course, however, the surface diagram 1102 may be implemented in any desired environment. Further, the aforementioned definitions may equally apply to the description below.

In one embodiment, the surface diagram 1102 provides a separate view (e.g. top down view, etc.) of surface diagram 1100 of FIG. 11A. Additionally, in various embodiments, the description relating to FIG. 1IA and FIG. 10A may be applied to FIG. 11B as well.

Figure 12:
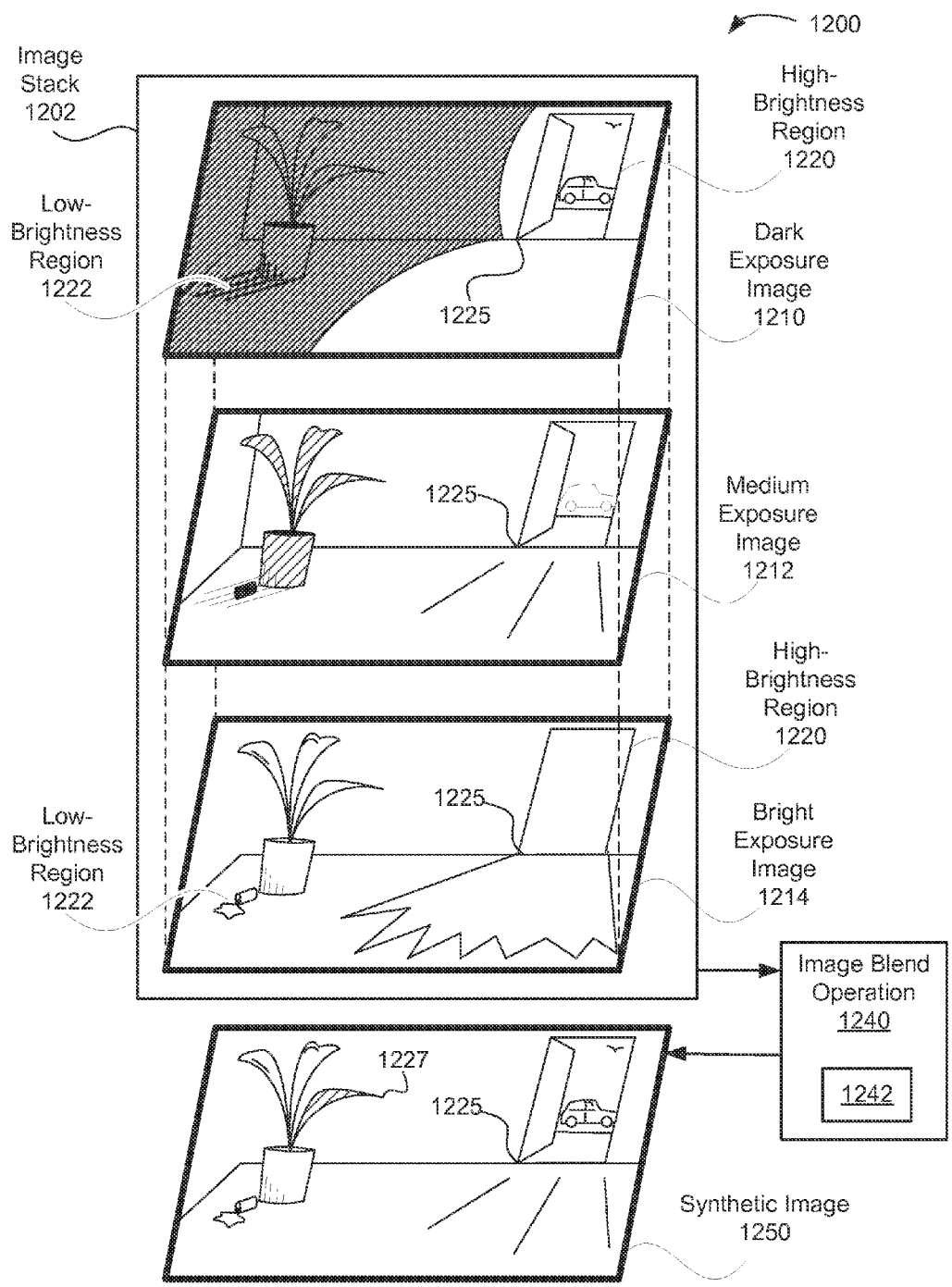
FIG. 12 illustrates an image blend operation, in accordance with another embodiment.

FIG. 12 illustrates an image synthesis operation 1200, in accordance with another embodiment. As an option, the image synthesis operation 1200 may be implemented in the context of the details of any of the Figures. Of course, however, the image synthesis operation 1200 may be carried out in any desired environment. Further, the aforementioned definitions may equally apply to the description below.

As shown, an image blend operation 1240 comprising the image synthesis operation 1200 may generate a synthetic image 1250 from an image stack 1202, according to one embodiment of the present invention. Additionally, in various embodiments, the image stack 1202 may include images 1210, 1212, and 1214 of a scene, which may comprise a high brightness region 1220 and a low brightness region 1222. In such an embodiment, medium exposure image 1212 is exposed according to overall scene brightness, thereby generally capturing scene detail.

In another embodiment, medium exposure image 1212 may also potentially capture some detail within high brightness region 1220 and some detail within low brightness region 1222. Additionally, dark exposure image 1210 may be exposed to capture image detail within high brightness region 1220. In one embodiment, in order to capture high brightness detail within the scene, image 1210 may be exposed according to an exposure offset from medium exposure image 1212.

In a separate embodiment, dark exposure image 1210 may be exposed according to local intensity conditions for one or more of the brightest regions in the scene. In such an embodiment, dark exposure image 1210 may be exposed according to high brightness region 1220, to the exclusion of other regions in the scene having lower overall brightness. Similarly, bright exposure image 1214 is exposed to capture image detail within low brightness region 1222. Additionally, in one embodiment, in order to capture low brightness detail within the scene, bright exposure image 1214 may be exposed according to an exposure offset from medium exposure image 1212. Alternatively, bright exposure image 1214 may be exposed according to local intensity conditions for one or more of the darkest regions of the scene.

As shown, in one embodiment, an image blend operation 1240 may generate synthetic image 1250 from image stack 1202. Additionally, in another embodiment, synthetic image 1250 may include overall image detail, as well as image detail from high brightness region 1220 and low brightness region 1222. Further, in another embodiment, image blend operation 1240 may implement any technically feasible operation for blending an image stack. For example, in one embodiment, any high dynamic range (HDR) blending technique may be implemented to perform image blend operation 1240, including but not limited to bilateral filtering, global range compression and blending, local range compression and blending, and/or any other technique which may blend the one or more images. In one embodiment, image blend operation 1240 includes a pixel blend operation 1242. The pixel blend operation 1242 may generate a pixel within synthetic image 1250 based on values for corresponding pixels received from at least two images of images 1210, 1212, and 1214. In one embodiment, pixel blend operation 1242 comprises pixel blend operation 731 of FIG. 7B. Further, the pixel blend operation 1242 may be implemented within blending circuitry, such as blending circuitry 501 of FIG. 5. For example, the synthetic image 1250 may comprise a plurality of HDR pixels of an HDR pixel stream, which is generated based on a received pixel stream including two or more exposures of an image.

In certain embodiments, at least two images of images 1210, 1212, 1214 are generated from a single analog image, as described in U.S. patent application Ser. No. 14/534,079, filed Nov. 5, 2014, entitled "IMAGE SENSOR APPARATUS AND METHOD FOR OBTAINING MULTIPLE EXPOSURES WITH ZERO INTERFRAME TIME," which is incorporated by reference as though set forth in full, thereby substantially eliminating any alignment processing needed prior to blending the images 1210, 1212, 1214. In other embodiments, at least two images of images 1210, 1212, 1214 are generated from two or more analog images that are captured or sampled simultaneously, as described in application Ser. No. 14/534,089, filed Nov. 5, 2014, entitled "IMAGE SENSOR APPARATUS AND METHOD FOR SIMULTANEOUSLY CAPTURING MULTIPLE IMAGES"; or application Ser. No. 14/535,274, filed Nov. 6, 2014, entitled "IMAGE SENSOR APPARATUS AND METHOD FOR SIMULTANEOUSLY CAPTURING FLASH AND AMBIENT ILLUMINATED IMAGES"; or application Ser. No. 14/535,279, filed Nov. 6, 2014, entitled "IMAGE SENSOR APPARATUS AND METHOD FOR OBTAINING LOW-NOISE, HIGH-SPEED CAPTURES OF A PHOTOGRAPHIC SCENE," which are incorporated by reference as though set forth in full, thereby substantially eliminating any alignment processing needed prior to blending the images 1210, 1212, 1214.

Still yet, in various embodiments, one or more of the techniques disclosed herein may be applied to a variety of markets and/or products. For example, although the techniques have been disclosed in reference to a still photo capture, they may be applied to televisions, video capture, web conferencing (or live streaming capabilities, etc.), security cameras (e.g. increase contrast to determine characteristic, etc.), automobiles (e.g. driver assist systems, in-car infotainment systems, etc.), and/or any other product which includes a camera input.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
   circuitry for:
   receiving a pixel stream including at least two exposures per pixel from a plurality of pixels of an image sensor, wherein receiving the pixel stream includes receiving a first exposure of a pixel, a second exposure of the pixel, and a third exposure of the pixel;
   identifying a first pixel attribute of the first exposure of the pixel;
   identifying a second pixel attribute of the second exposure of the pixel;

identifying a third pixel attribute of the third exposure of the pixel;

identifying a first scalar based on the first pixel attribute and the second pixel attribute;

identifying a second scalar based on the second pixel attribute and the third pixel attribute;

blending, based on the first scalar, the first exposure of the pixel and the second exposure of the pixel;

blending, based on the second scalar, the second exposure of the pixel and the third exposure of the pixel;

generating a first resulting pixel based on the blending of the first exposure of the pixel and the second exposure of the pixel; and generating a second resulting pixel based on the blending of the second exposure of the pixel and the third exposure of the pixel;

generating a high dynamic range (HDR) pixel stream by performing HDR mixing on the first resulting pixel and the second resulting pixel; and outputting the HDR pixel stream.

2. The apparatus of claim 1, wherein the apparatus is operable such that the first pixel attribute includes a first intensity, and the second pixel attribute includes a second intensity.

3. The apparatus of claim 1, wherein the apparatus is operable such that the first pixel attribute includes a first saturation, and the second pixel attribute includes a second saturation.

4. The apparatus of claim 1, wherein the apparatus is operable such that the first scalar and/or second scalar is identified by at least one of generating, selecting, and interpolating.

5. The apparatus of claim 1, wherein the apparatus is operable such that the first scalar or second scalar is identified utilizing a plurality of polynomials.

6. The apparatus of claim 5, wherein the apparatus is operable such that a first polynomial of the plurality of polynomials is a function of the first pixel attribute and a second polynomial of the plurality of polynomials is a function of the second pixel attribute, and wherein the first polynomial is at least one of a higher order, an equal order, and a lower order relative to the second polynomial.

7. The apparatus of claim 1, wherein the apparatus is operable such that the first scalar is identified based on a mix value function that receives as inputs the first pixel attribute and the second pixel attribute, wherein the mix value function includes a flat region, a transition region, and a saturation region corresponding to thresholds associated with the inputs.

8. The apparatus of claim 1, wherein the apparatus is operable such that the first scalar is identified based on either a polynomial of the form $z=(1-(1-(1-x)^A)^B)*((1-(1-y)^C)^D)$ or a polynomial of the form $z=((1-(1-x)^A)^B)*((1-(1-y)^C)^D)$, where z corresponds to the first scalar, x corresponds to the second pixel attribute, y corresponds to the first pixel attribute, and A, B, C, D correspond to arbitrary constants.

9. The apparatus of claim 1, wherein the apparatus is operable such that the blending of the first pixel exposure and the second pixel exposure results in a high dynamic range (HDR) pixel as an output.

10. The apparatus of claim 9, wherein the HDR pixel is output in the HDR pixel stream.

11. The apparatus of claim 1, wherein the apparatus is operable such that the first resulting pixel and the second resulting pixel are combined resulting in a combined pixel.

12. The apparatus of claim 11, wherein the combined pixel includes a HDR pixel that is output in the HDR pixel stream.

13. The apparatus of claim 12, wherein the HDR pixel stream includes a plurality of HDR pixels such that each HDR pixel of the plurality of HDR pixels is associated with a different pixel of the image sensor, and each of the HDR pixels is generated based on the at least two exposures.

14. The apparatus of claim 1, wherein the first pixel attribute includes a first value, the third pixel attribute includes a third value, and the second pixel attribute includes a second value between the first value and the third value.

15. A computer program product embodied on a non-transitory computer readable medium, comprising:

code for allowing receipt of a pixel stream including at least two exposures per pixel from a plurality of pixels of an image sensor, wherein allowing receipt of the pixel stream includes receiving a first exposure of a pixel, a second exposure of the pixel, and a third exposure of the pixel;

code for identifying a first pixel attribute of the first exposure of the pixel;

code for identifying a second pixel attribute of the second exposure of the pixel;

code for identifying a third pixel attribute of the third exposure of the pixel;

code for identifying a first scalar based on the first pixel attribute and the second pixel attribute;

code for identifying a second scalar based on the second pixel attribute and the third pixel attribute;

code for blending, based on the first scalar, the first exposure of the pixel and the second exposure of the pixel;

code for blending, based on the second scalar, the second exposure of the pixel and the third exposure of the pixel;

code for generating a first resulting pixel based on the blending of the first exposure of the pixel and the second exposure of the pixel; and code for generating a second resulting pixel based on the blending of the second exposure of the pixel and the third exposure of the pixel;

code for allowing generation of a high dynamic range (HDR) pixel stream by performing HDR mixing on the first resulting pixel and the second resulting pixel; and code for receiving the HDR pixel stream.

16. A method, comprising:

receiving a pixel stream including at least two exposures per pixel from a plurality of pixels of an image sensor, wherein receiving the pixel stream includes receiving a first exposure of a pixel, a second exposure of the pixel, and a third exposure of the pixel;

identifying a first pixel attribute of the first exposure of the pixel;

identifying a second pixel attribute of the second exposure of the pixel;

identifying a third pixel attribute of the third exposure of the pixel;

identifying a first scalar based on the first pixel attribute and the second pixel attribute;

identifying a second scalar based on the second pixel attribute and the third pixel attribute;

blending, based on the first scalar, the first exposure of the pixel and the second exposure of the pixel;

blending, based on the second scalar, the second exposure of the pixel and the third exposure of the pixel;

generating a first resulting pixel based on the blending of the first exposure of the pixel and the second exposure of the pixel; and generating a second resulting pixel based on the blending of the second exposure of the pixel and the third exposure of the pixel;

generating a high dynamic range (HDR) pixel stream by performing HDR mixing on the first resulting pixel and the second resulting pixel; and outputting the HDR pixel stream.

* * * * *